United States Patent
Ullmann et al.

(10) Patent No.: US 9,552,087 B2
(45) Date of Patent: Jan. 24, 2017

(54) MULTI-LAYER BODY

(71) Applicant: POLYIC GMBH & CO. KG, Fürth (DE)

(72) Inventors: Andreas Ullmann, Zirndorf (DE); Walter Fix, Furth (DE); Manfred Walter, Nuremberg (DE); Merlin Welker, Essingen (DE); Jurgen Krumm, Erlangen (DE); Mathias Maul, Burgthann (DE); Toblias Menger, Erlangen (DE)

(73) Assignee: PolyIC GmbH & Co. KG, Furth (DE)

( * ) Notice: Subject to any disclaimer, the term of this patent is extended or adjusted under 35 U.S.C. 154(b) by 0 days.

(21) Appl. No.: 14/411,049

(22) PCT Filed: Jun. 26, 2013

(86) PCT No.: PCT/EP2013/063424
§ 371 (c)(1),
(2) Date: Dec. 23, 2014

(87) PCT Pub. No.: WO2014/001405
PCT Pub. Date: Jan. 3, 2014

(65) Prior Publication Data
US 2015/0193035 A1    Jul. 9, 2015

(30) Foreign Application Priority Data

Jun. 28, 2012  (DE) .......... 10 2012 105 713
Dec. 11, 2012  (DE) .......... 10 2012 112 112

(51) Int. Cl.
*G06F 3/041*    (2006.01)
*G06F 1/16*    (2006.01)
(Continued)

(52) U.S. Cl.
CPC ............. *G06F 3/041* (2013.01); *G06F 1/16* (2013.01); *G06F 3/044* (2013.01); *H05B 3/34* (2013.01); *G06F 2203/04112* (2013.01)

(58) Field of Classification Search
CPC ........... G06F 3/041; G06F 1/16; G06F 3/044; G06F 2203/04112; G06F 2203/0411; H05B 3/34; H05B 3/86; H05K 1/0298; H05K 1/0289; H05K 2201/09681; H05K 2203/175; B32B 2457/208
See application file for complete search history.

(56) References Cited

U.S. PATENT DOCUMENTS 4,304,976 A    12/1981 Gottbreth et al.
4,659,874 A    4/1987 Landmeier
(Continued)

FOREIGN PATENT DOCUMENTS

DE    102010043055 A1    5/2011
DE    202011052530 U1    2/2012
(Continued)

*Primary Examiner* — Dwayne Bost
*Assistant Examiner* — Ivelisse Martinez Quiles
(74) *Attorney, Agent, or Firm* — William Squire

(57) ABSTRACT

In a multi-layer body with a carrier and at least one conduction layer first areas and second areas are galvanically isolated from each other by third areas. In the third area sections are omitted from conductor traces and replaced by replacement pieces. The multi-layer body thereby has an optically homogeneous effect (e.g. is uniformly transparent or uniformly reflective).

22 Claims, 22 Drawing Sheets

Figure 1A:
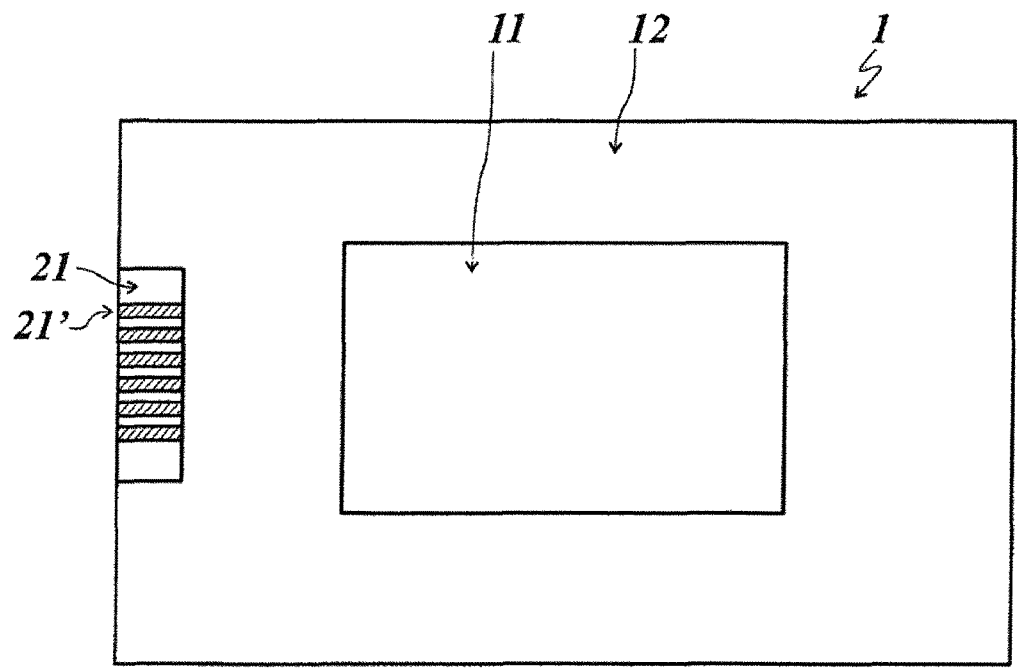

(51) Int. Cl.
*G06F 3/044* (2006.01)
*H05B 3/34* (2006.01)

(56) References Cited

U.S. PATENT DOCUMENTS

| | | | |
|---|---|---|---|
| 4,879,508 A | 11/1989 | Andermo | |
| 5,034,740 A | 7/1991 | Acher | |
| 6,049,063 A * | 4/2000 | Barber | F24D 13/02 219/213 |
| 6,222,522 B1 | 4/2001 | Mathews et al. | |
| 9,018,536 B2 | 4/2015 | Ullmann et al. | |
| 2004/0095336 A1 | 5/2004 | Hong et al. | |
| 2006/0097991 A1 | 5/2006 | Hotelling et al. | |
| 2009/0073135 A1 | 3/2009 | Lin et al. | |
| 2009/0219258 A1 | 9/2009 | Geaghan | |
| 2010/0123670 A1* | 5/2010 | Philipp | G06F 3/044 345/173 |
| 2010/0156840 A1* | 6/2010 | Frey | G06F 3/044 345/174 |
| 2010/0302204 A1* | 12/2010 | Miyayama | G06F 3/044 345/174 |
| 2011/0022351 A1 | 1/2011 | Philipp et al. | |
| 2011/0062146 A1* | 3/2011 | Kuriki | H05B 3/84 219/553 |
| 2011/0102361 A1* | 5/2011 | Philipp | G06F 3/044 345/174 |
| 2012/0062250 A1* | 3/2012 | Kuo | G06F 3/044 324/686 |
| 2012/0193130 A1 | 8/2012 | Fix et al. | |
| 2012/0194441 A1* | 8/2012 | Frey | G06F 3/041 345/173 |
| 2012/0262412 A1* | 10/2012 | Guard | G06F 3/044 345/174 |
| 2012/0273336 A1 | 11/2012 | Kuriki | |
| 2012/0312677 A1 | 12/2012 | Kuriki | |
| 2013/0113502 A1* | 5/2013 | Yilmaz | G06F 3/044 324/649 |
| 2013/0141369 A1* | 6/2013 | Huang | G06F 3/041 345/173 |
| 2013/0155001 A1* | 6/2013 | Yilmaz | G06F 3/044 345/174 |
| 2013/0222328 A1* | 8/2013 | Cok | G06F 3/044 345/174 |
| 2013/0234974 A1 | 9/2013 | Guard | |
| 2014/0054070 A1 | 2/2014 | Ichiki | |
| 2014/0166464 A1 | 6/2014 | Fix et al. | |
| 2014/0238728 A1 | 8/2014 | Fix et al. | |
| 2014/0293154 A1 | 10/2014 | Philipp | |

FOREIGN PATENT DOCUMENTS

| | | |
|---|---|---|
| DE | 202011052530 U1 | 4/2012 |
| DE | 202012101734 U1 | 7/2012 |
| EP | 2440990 A1 | 4/2012 |
| EP | 2463759 A1 | 6/2012 |
| WO | WO2011/093420 A1 | 8/2011 |
| WO | WO2012/111819 A1 | 8/2012 |

* cited by examiner

MULTI-LAYER BODY

The invention relates to a multi-layer body with a carrier layer and at least one conduction layer arranged on the carrier layer, wherein the conduction layer in the present case is to have electrically conductive traces ("conductor traces"). Such a multi-layer body can be used in particular to provide a touch panel functionality. It can also be used as a heater.

In a touch panel, a total panel area comprises a plurality of subareas, namely individual areas of surface, in each of which a measurement device is provided in order to detect a touch or at least an approach by a touch object such as for example a finger. In particular in a capacitively functioning touch panel device the individual touch panels are formed by two interacting areas of surface. In order that they can interact capacitively or via an electromagnetic alternating field, these areas of surface must be galvanically isolated from each other. The conductor traces (i.e. the electrically conductive elements) of one area of surface have a coupling-out action, either capacitively or via an electromagnetic field, and the corresponding conductor traces of the other area of surface have a coupling-in action, and thus a coupling can take place from one area of surface into the other area of surface. In particular, one area of surface acts as a transmission area, i.e. is provided for use as an area that transmits an electromagnetic field, and the other area of surface then acts as a receiving area, thus receives the electromagnetic field.

For touch panels, it has proved worthwhile if the conductor traces have an (in particular uniform) width from the range of from 1 μm and up to 300 μm, preferably from the range of from 5 μm to 50 μm, quite particularly preferably from the range of from 5 μm to 25 μm. Such conductor traces then cannot be resolved by the human eye without an aid and only slightly reduce the transparency of the multi-layer body (for instance in the case of a strongly transparent carrier layer), they can optionally also reflect slightly (e.g. if they are formed from a strongly reflective metal such as, for instance, silver and the like). The multi-layer body preferably has a transparency of at least 50%, preferably of at least 80%, particularly preferably of at least 90% and quite particularly preferably of at least 95%.

However, the reduction of the transparency or slight reflective property is usually not very striking. This is the case in particular when the conductor traces are provided in an arrangement in which in each case they touch one or more other conductor traces, with the result that the arrangement has a regular pattern; or alternatively when the arrangement originates from a regular pattern by, in particular stochastic, variation of a parameter defined to form a regular pattern (such as for instance distance or angle).

The arrangement can in particular form a conductor trace grid which, through a sufficiently high number of cross-over points, guarantees a homogeneous surface conductivity despite the small coverage with conductive material.

A problem in the provision of the galvanic isolation between different areas defined in this way by provision of a pattern of conductor traces is that openings must be provided in the at least one conduction layer and thus in the multi-layer body in individual areas of surface. Precisely in the case of a capacitive coupling between individual types of touch panel areas, the holes must be relatively large. With this it is possible here to also make do by filling in the holes with conductor traces in the same pattern; but then the isolation points necessary for the galvanic coupling-out also become visible as such for an observer.

The same problem also exists in the case of heating elements with or made of a multi-layer body with the named properties: there too it can be desired that the actual electric lines are not visible and are provided in the form of conductor traces with the above-named dimensions of their width. Even in the case of such conductor trace patterns used for heating elements there must necessarily be a galvanic isolation of different areas which is, however, not to be visible for the observer.

The object of the present invention is therefore to provide a multi-layer body with a carrier layer and, on the carrier layer, at least one conduction layer with electrically conductive conductor traces, which multi-layer body has, over several areas galvanically isolated from each other, such a uniform transparency and/or reflects uniformly such that the galvanic isolation points impair the optical impression as little as possible, in particular such that a human observer sees the multi-layer body as formed substantially homogeneous, although the galvanic isolation points are present.

This object is achieved by a multi-layer body with a carrier layer and, on the carrier layer, at least one conduction layer with electrically conductive conductor traces, wherein the multi-layer body has a first area and a second area, wherein both in the first area and in the second area, in each case, conductor traces are galvanically coupled to each other in that they are provided in an arrangement in which the conductor traces in each case touch one or more other conductor traces, and wherein the first and the second area are galvanically isolated from each other by a third area, and wherein in the third area the conductor traces are continued (thus are likewise present), wherein, however, sections are omitted from the conductor traces such that isolation points are formed, and wherein the omitted sections are replaced by in particular conductive replacement pieces which are arranged at or next to the isolation points and which are arranged such that a galvanic isolation of the first and second areas brought about by the omission is maintained.

Through the provision of the replacement pieces, material for a conductor trace thus does not simply disappear in each case in the area of an omitted section. Because of the presence of the replacement pieces, it is possible to compensate for the consequences of the disappearance of the omitted sections at least partially in order to improve the optical impression that the multi-layer body gives to an observer, in the sense of a homogenization of the effect (in respect of transparency or transmittance and/or in respect of the reflective property).

The conductor traces are preferably arranged in the first and second areas such that the arrangement has a pattern. This pattern can be in particular a regular pattern. Alternatively, it can originate from this regular pattern by (for example stochastic) variation of a parameter defined to form such a regular pattern. On the basis of a suitable design of such a pattern, it is possible to ensure a uniform average coverage of the multi-layer body with conductor traces, with the result that the visual impression is homogeneous. The average coverage can be defined in particular over units of surface which are between 10 and 300 μm, preferably between 20 and 80 μm, long in an extension direction.

The concept of providing a stochastic variation of a parameter defined to form such a regular pattern forms another, independent aspect of the present application which, although in the present case it is reflected in dependent claims, could also equally well be the subject of independent claims.

Here:

A conductor trace grid is characterized for example in that it has grid points and, between these, "grid meshes", i.e. unit cells of the grid or grid cells. These grid cells have two edge lengths in the two-dimensional grid: one along the x-axis and one along the y-axis. The edge lengths of the grid cells can be of the same order of magnitude as produced for example by a grid which can be represented by squares arranged in a line. The edge lengths can, however, also differ greatly from each other, with the result that in the two-dimensional representation gaps arranged in a line result.

The electrically conductive areas of surface and/or the conductor traces within the electrically conductive areas of surface form a grid for constructing a touch panel, for example within a multi-layer body for providing a touch panel functionality. In this grid, the areas of surface and the conductor traces are arranged for example such that touch panels and connections are delimited. For example, touch panels of a first class act as coupling-out touch panels, e.g. that emit an electromagnetic field, and touch panels of a second class, e.g. touch panels that receive an electromagnetic field, are galvanically isolated from these touch panels of a first class. For both classes, in each case a plurality of touch panels of the respective class are galvanically coupled via connections (i.e. conductor traces).

The isolation of the electrically conductive areas of surface takes place via a galvanic isolating spacing of the areas of surface, with the result that a gap results visually between two neighboring areas of surface which are covered with conductor traces. In the arrangement of these areas of surface, isolated by gaps, a grid forms in which the grid meshes or grid cells are "filled", i.e. are areas of surface covered with conductor traces, and the grid itself is formed by the empty spaces between the filled grid cells by electrically insulating and—as these are located on a transparent carrier—transparent gaps.

A disadvantage of the grids is that, in an arrangement of the inherently transparent layer covered with grids with for example a display apparatus to form a multi-layer body, regular grids can be formed superstructures, which reduce and disrupt the transparency of the multi-layer body. The so-called moiré diffraction effects are particularly known, which appear here by stacking at least one layer, transparent per se, to form a multi-layer body.

Thus there is always the need to improve the conductor trace grids on the transparent substrates to the effect that when a multi-layer body is formed by stacking at least one layer covered with a grid the formation of a moiré diffraction effect is further suppressed.

Accordingly, the object regarding the further aspect, not claimed separately here, is to provide a multi-layer body with at least one layer which is transparent, but covered completely or partially with conductor traces, and which suppresses the formation of visible superstructures of the grids when stacked to form the multi-layer body.

This other object is achieved by a multi-layer body which comprises at least one layer which is transparent, but completely or partially covered with traces, wherein at least one grid of traces which are not transparent and yet cannot be resolved by the human eye and/or of transparent gaps is arranged between grid cells filled with a coverage by traces, and at least some of the grid points forming the grid and/or at least some of the edges of the grid cells are placed randomly or pseudorandomly within predetermined limits and/or are varied in terms of length and/or angle relative to each other.

The predetermined limits are predetermined for example by the grid constants of an originally periodic grid forming a basis. It can thus be provided that the shift of a grid point within a grid with an edge length of the periodic grid cell, thus of the unit cell forming the basis, of a or b takes place within the limit of $-a/2$ and $+a/2$ or $+b/2$ and $-b/2$ on the axis which comprises this grid edge. This limit ensures for example that no grid point is shifted beyond the position of the grid point lying closest to it in the original grid. Effects on the conductivity of the area of surface for example can thus be substantially prevented or reduced.

A further range, within which the grid points are shifted according to the further aspect for example randomly or pseudorandomly, is specified by the limits $+a/3$ and $-a/3$ or for example the limits $+b/4$ to $-b/5$, in each case always the values along the axis on which the grid cell edge named by the symbol also lies. The original grid point represents for example the zero point.

If the multi-layer body is used in an operating apparatus with a display apparatus, such as e.g. a touchscreen, touch-sensor panels are provided which have the transmission and receiving panels. The transmission and receiving panels are galvanically isolated from each other by a gap.

The gaps form a grid which for example defines the transmission and receiving panels as grid cells. The grid is preferably constructed non-periodically or partially periodically, but it can be derived from a periodic grid.

In contrast to a grid of non-transparent traces, the grid points of a grid of gaps that are transparent, because they are exposed and provided—for example—galvanically for isolation, are not explicitly visible, but form in the virtual extension of the non-transparent traces which are the coverage or the filled-in one of the grid cells.

A grid cell made of panels covered with conductor traces can vary as desired in terms of the shape, for example meandering and/or interdigital structures of the gaps can also delimit the grid cells.

The predetermined limit, within which the shift of a grid point on a spatial axis can be varied, is advantageously the length or width of the grid cell. Likewise, the predetermined limit, within which the shift of a grid point in a plane can be varied, is advantageously the surface area of the grid cell.

According to an advantageous embodiment regarding this further aspect, the coverage of the transparent carrier with a grid of non-transparent traces, grid points and/or grid cells is homogeneous, in particular homogeneous within a conductive area, in order that a reliably constant surface conductivity is ensured. An average density of coverage which is predetermined can be used for this. It can relate to differently sized grid areas of surface, for example it can relate to an electrically conductive area of surface or also to a touch panel which comprises several of these areas of surface which are electrically conductive and interact.

The limit within which the shift of the gap in the spatial direction towards the transmission and receiving area takes place is advantageously the distance that guarantees the galvanic isolation of the transmission and receiving area.

The limit within which the shift of the gap in the spatial direction along the gap takes place, on the other hand, is set by the edge length of the corresponding grid cell.

In the present case, statistically and/or randomly chosen means that no periodicity and also no preferred direction within the pattern that forms the grid, in particular the grid cells and/or grid points, can be derived, but all points of the layer are statistically covered by conductive non-transparent traces and/or transparent gaps with a probability that is set for example by a predetermined distribution.

Within the meaning of the further aspect discussed here, homogeneous coverage of the transparent carrier with non-transparent traces and/or transparent gaps means that the surface coverage of the transparent carrier thus fluctuates at most in a range of +/−20%, preferably in the range of +/−15% and in particular preferably in a range of less than 5%, thus the area of surface which is least covered with traces or gaps has at most 40% less coverage than the area which is the most densely covered with traces or gaps.

By "coverage" of the transparent substrate is meant that the substrate is covered two-dimensionally by non-transparent traces or transparent gaps between "filled" grid meshes.

A very homogeneous surface coverage is advantageous in particular when a homogeneous surface conductivity is to be achieved.

A homogeneous surface conductivity, on the other hand, can also be achieved by an additional number z of grid points within a predetermined area of surface. For example, the additional grid points z are not real crossover points of two conductor traces or two transparent gaps, but a grid point which simply links two ends of the same conductor trace and/or the same transparent gaps, away from a direct line.

According to an advantageous embodiment regarding the further aspect, the coverage of the transparent carrier with grid points is homogeneous, with the result that the conductivity is homogeneous over the surface.

According to an advantageous embodiment regarding the further aspect, in the case of a surface coverage of the transparent carrier with the grid, the grid points are shifted by a value of between 0 and +/−a along the x-axis and by a value of between 0 and +/−b along the y-axis, provided that the x- and y-axes span the surface. The values of a and b conform to the length of the unit cell of the grid, with the proviso that, to achieve four-sided unit cells for example, the value of a/2 and b/2 is smaller than the edge length along the x- or y-axis respectively.

The probability or the frequency with which a grid point is shifted by a particular value between +a and −a on the x-axis conforms for example to Gaussian distribution, the so-called normal distribution. As an alternative to normal distribution, uniform distribution or triangular distribution can also be chosen, all the more so as the fact that a value of a shift occurs in a particular frequency does not contradict a statistical distribution of its occurrence.

The two-dimensional expansions of the distributions, thus for example the 2D Gaussian distribution for both spatial directions or other 2D distributions, can also reflect the probability or frequency with which a grid point experiences a particular shift within a predetermined limit or a predetermined range.

The distributions can also be combined with each other as desired.

The distributions can be the same or different in both directions.

Non-uniform grid meshes or grid cells also advantageously form due to the shift of the grid points.

Due to the embodiment according to the further aspect with the grid points or edges placed randomly or pseudo-randomly and/or varied in terms of length and/or angle relative to each other the advantage is achieved that the danger of diffraction effects, in particular moiré effects, occurring is reduced. If for example a multi-layer body formed according to the further aspect and a body with a regularly structured surface, for example a pixelated display, are superimposed on each other, moiré effects occur to a reduced extent or even not at all, because of the lack of optical interferences. The same applies in the case of the superimposition of a first such multi-layer body with a second such multi-layer body in such a way that the surface normals of the two multi-layer bodies are oriented parallel to each other. Moiré effects are particularly well reduced or prevented when, although the first multi-layer body and the second multi-layer body are formed according to the further aspect, they are formed different from each other.

A return is now made to the actual main aspect of the present invention in which a variation of the above-named type need not necessarily take place:

In the design of a pattern provided by the arrangement in a layout program, it is advantageous if the same pattern forms the basis in both areas, wherein this same pattern is then continued in the third area.

This preferred embodiment can be specified as a multi-layer body with a carrier layer and, on the carrier layer, at least one conduction layer with electrically conductive conductor traces, wherein the multi-layer body has a first area and a second area, wherein both in the first area and in the second area, in each case, conductor traces are galvanically coupled to each other in that they are provided in an arrangement in which the conductor traces in each case touch one or more other conductor traces, with the result that the arrangement has a regular pattern or originates from a regular pattern by (in particular stochastic) variation of a parameter defined to form a regular pattern (distance between two conductor traces or angle between two conductor traces), wherein in both areas the same pattern forms the basis, and wherein the two areas are galvanically isolated from each other by a third area (a type of transition area), and wherein in the third area the conductor traces are arranged such that the pattern forming the basis in the first and second areas is continued (or at least is continued inherently), but sections are omitted from the pattern such that isolation points are formed in at least one conductor trace, and wherein the omitted sections are replaced by conductive replacement pieces which are arranged at or next to the isolation points and which are arranged such that a galvanic isolation of the first and second areas brought about by the omission of the sections is maintained.

The dimensions of the individual components naturally depend on the intended use of the multi-layer body; in particular on from how far away the multi-layer body is viewed during use: if the multi-layer body is used for a touch panel functionality in a mobile telephone (for instance a smartphone), then the distance from the observer's eye is approx. 80 cm. If the multi-layer body is used as a heating element on the wall of a room, the typical viewing distance may be several meters.

However, it is advantageous if the conductor traces, even when viewed from close up, cannot be differentiated from each other as such in pairs; this is the case in particular when the conductor traces have an, in particular uniform, width of between 1 μm and 300 μm, preferably of between 5 μm and 50 μm, and when the replacement pieces are spaced apart from the conductor traces by at most three times, particularly by at most twice, this width.

The effect of a homogenization in respect of the transparency/transmittance or in respect of the proportion of the reflected light is achieved under the following provision: the replacement pieces are arranged so close to the isolation points that an average coverage of the carrier layer with material in the at least one conduction layer (thus in particular with electrically conductive material) over the first, third and second areas does not fluctuate by more than 15%, preferably not by more than 10% and particularly preferably not by more than 5%. The average coverage here is determined in each case for units of surface (unit squares or circles) with a dimension of between 10 and 300 μm, preferably of between 20 and 80 μm in an extension direction (the dimension would then be the side length of a square or the diameter of a circle). If the material in the at least one conduction layer is homogeneous, the transparency thus also does not fluctuate by more than the named percentages. If the replacement pieces are formed from the same material as the conductor traces (which is particularly simple to realize in terms of production technology), the proportion of reflecting light also does not fluctuate by more than the named percentage values.

The omitted sections can either comprise crossover points, or junctions, of conductor traces or lie on the other side of such crossover points or junctions. In other words, in the preferred embodiment, the openings are provided at crossover points in the pattern or provided between crossover points in the pattern.

In the variant where the openings are provided at crossover points, the replacement pieces are preferably positioned at in each case at least one pair of conductor traces. In this way, the arrangement can be formed symmetrically around the crossover point still existing virtually or at least one axis of reflection in the pattern. Crossover points are an area with a slight compression in the average surface coverage, where the replacement pieces are particularly inconspicuous.

On the other hand, by providing the openings between crossover points, it is possible to arrange the replacement pieces in various ways that are suitable in each case, e.g. for the preferably provided pattern and in particular the intended use of the multi-layer body.

In a first embodiment in which the openings are provided between crossover points in the pattern, the replacement pieces are conductor trace parts tilted away from each other (in the preferred case compared with the conductor traces of the pattern forming the basis). The two conductor trace parts are preferably tilted away from each other by the same angle, in each case from their attachment parts, with the result that for example in the case of rectilinear conductor traces these tilted conductor trace parts can be parallel to each other; then the respectively omitted section is not especially striking for an observer.

In this embodiment there are two variants: in one variant the conductor trace parts are in each case tilted compared with crossover points. Thus, said crossover point, not an additional point, is obtained as a "bend site". This can be designed to be very inconspicuous.

In another variant the tilted conductor trace parts are in each case tilted compared with other conductor trace parts protruding from the crossover points. The "bend points" therefore lie between two crossover points. By bending the conductor trace parts away into areas of surface previously not fulfilled by conductor trace parts a homogenization of the surface coverage in the third area can be ensured even to an increased extent.

In order to prevent undesired diffraction effects, the tilted conductor trace parts here can be tilted at exactly the same angle at which the conductor traces or also conductor trace parts protrude from the crossover point. The tilted conductor trace parts therefore run parallel to the other conductor trace parts or conductor trace parts and therefore do not generate any disruptive diffraction effects, which do not occur outside the third area.

A further embodiment in which the openings are provided between crossover points in the conductor traces provides that the replacement pieces are placed next to conductor trace parts.

Alternatively, they can be positioned at the conductor trace parts, in particular forming a T shape or an arrow shape or a cuff shape.

In all of the named embodiments in which the openings are provided between crossover points, the following measure, which ensures a homogenization of the visual impression of the multi-layer body to a particular extent, can be taken in the third area: at least two openings in neighboring conductor traces (of the pattern) in the third area are spaced apart here in each case between a pair of crossover points differently from two crossover points neighboring each other. This can be used in particular to rule out the possibility of drawing a straight line through several openings; such a straight line would still be recognizable for an observer even when the openings are provided in very narrow conductor traces over a small length.

The pattern of the conductor traces that forms the basis can be a grid pattern with four-sided, in particular square or rhombic cells; triangular cells or hexagonal cells in which the conductor traces meet at an angle of 60° or 120° respectively are also equally possible.

A quite different type of pattern includes regular non-rectilinear partial patterns in which the sections are omitted; the replacement pieces are then provided in that the regular non-rectilinear partial patterns are compressed, but ultimately extend over the same number of (partial) periods. The space obtained by the compression is then occupied by the isolation point.

The partial pattern can in particular be wavy, in particular even sinusoidal.

In a manner known per se, the multi-layer body can have, as first and second areas, a plurality of transmission areas (e.g. as first area) and receiving areas (e.g. as second area) for providing a touch panel functionality. Further types of areas are also possible, such as e.g. connection areas, via which several transmission areas or several receiving areas are galvanically coupled to each other. The invention also relates in this case to the galvanic isolation between such further areas (as second areas) and the first areas or such further areas (as first areas) and the second areas; in each case third areas are then located, as transition areas, between these pairings of areas.

The uses named at the beginning preferably apply to the multi-layer body: in a first use, the multi-layer body is a touch panel apparatus or a part of such an apparatus. An operating device with a display element can have in particular a single touch-sensitive layer, or it can be constructed in two layers. In a second use, the multi-layer body is a heating element. Other uses are possible.

Figure 1B:
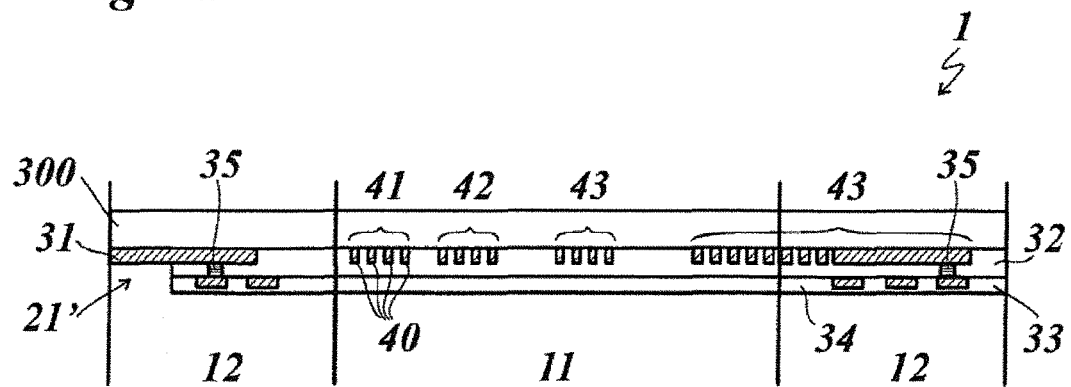
Figure 2A:
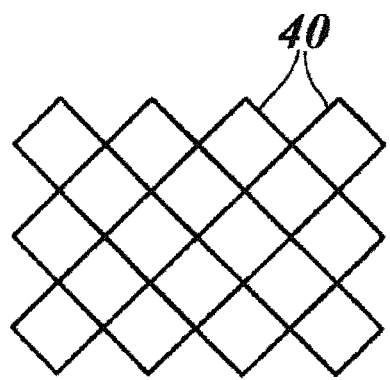
Figure 2B:
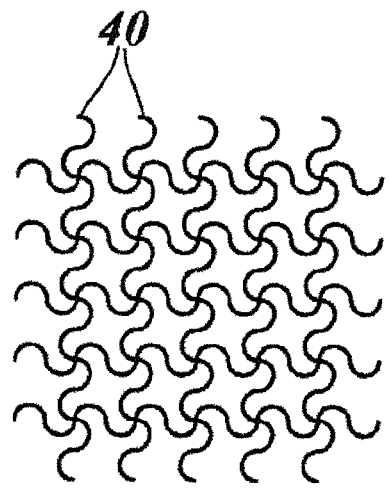
Figure 2C:
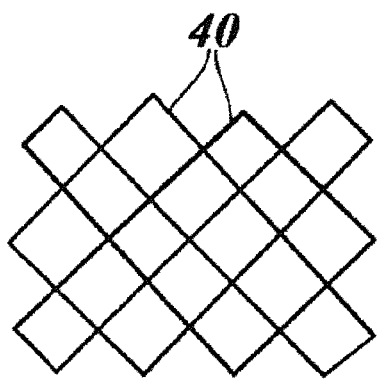
Figure 2D:
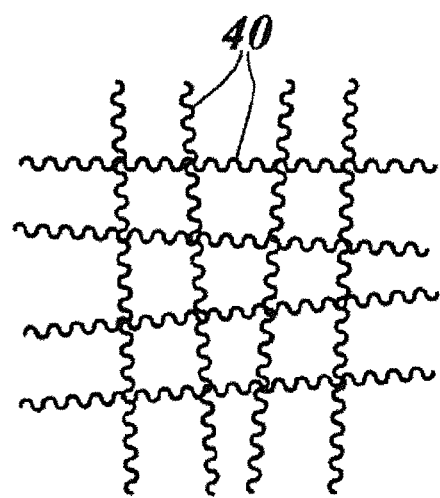
Figure 3A:
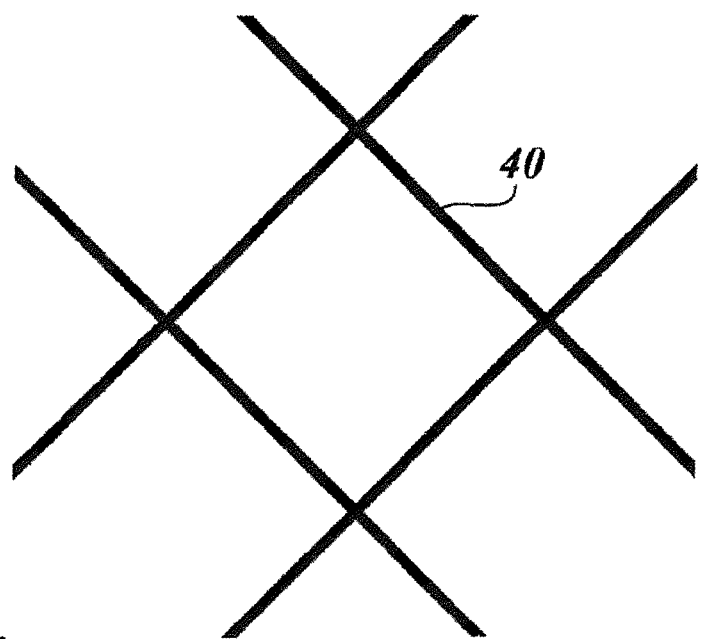
Figure 3B:
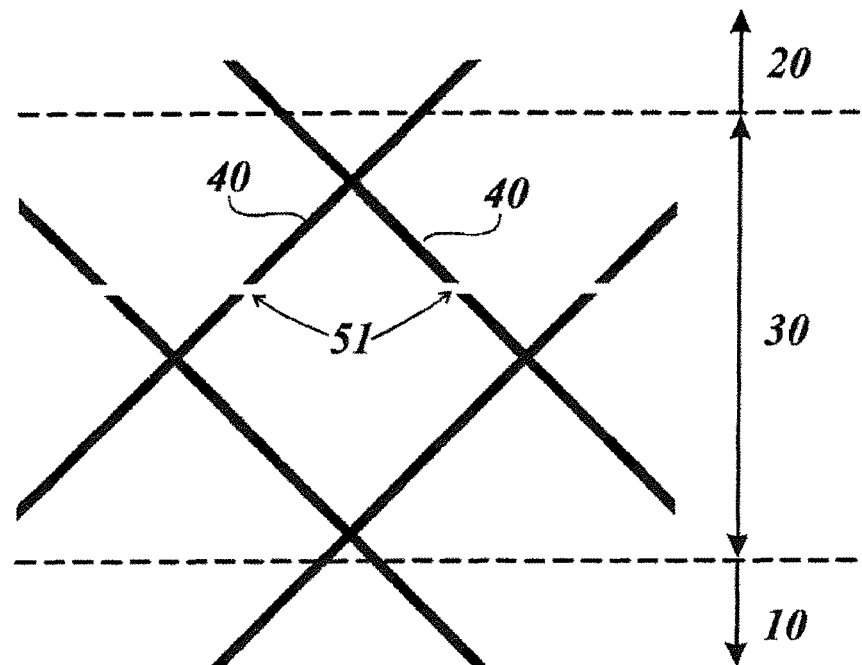
Figure 4:
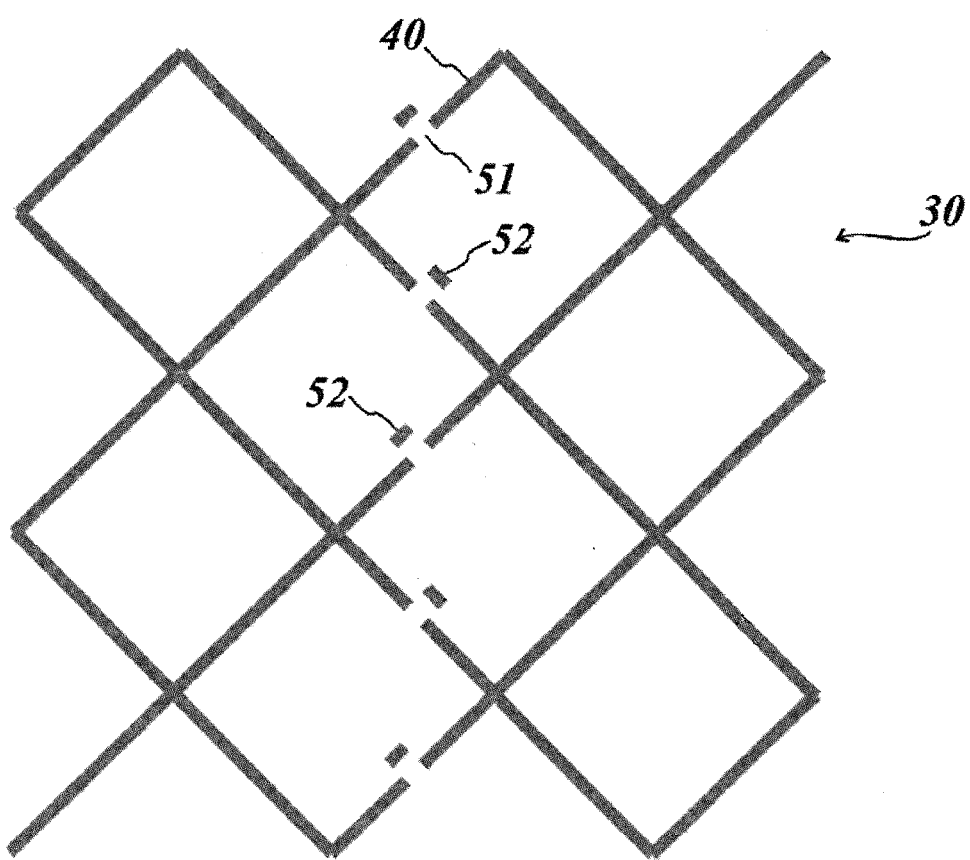
Figure 5:
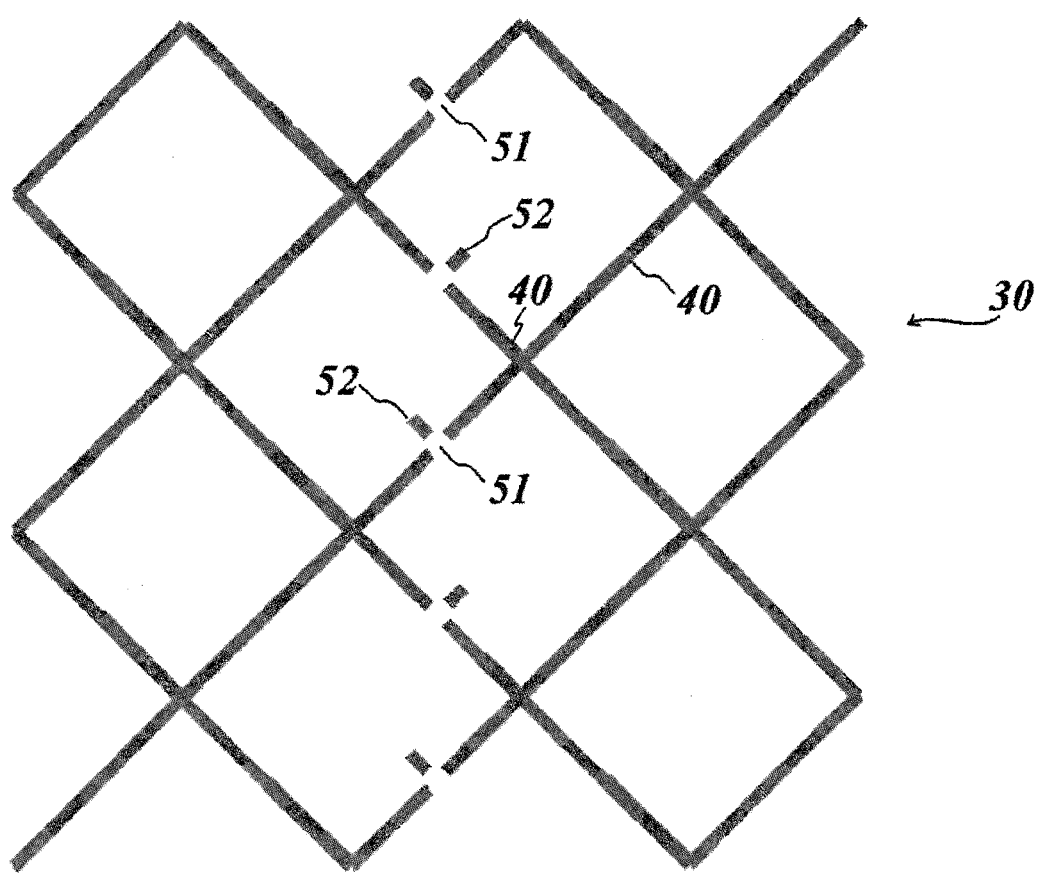
Figure 6:
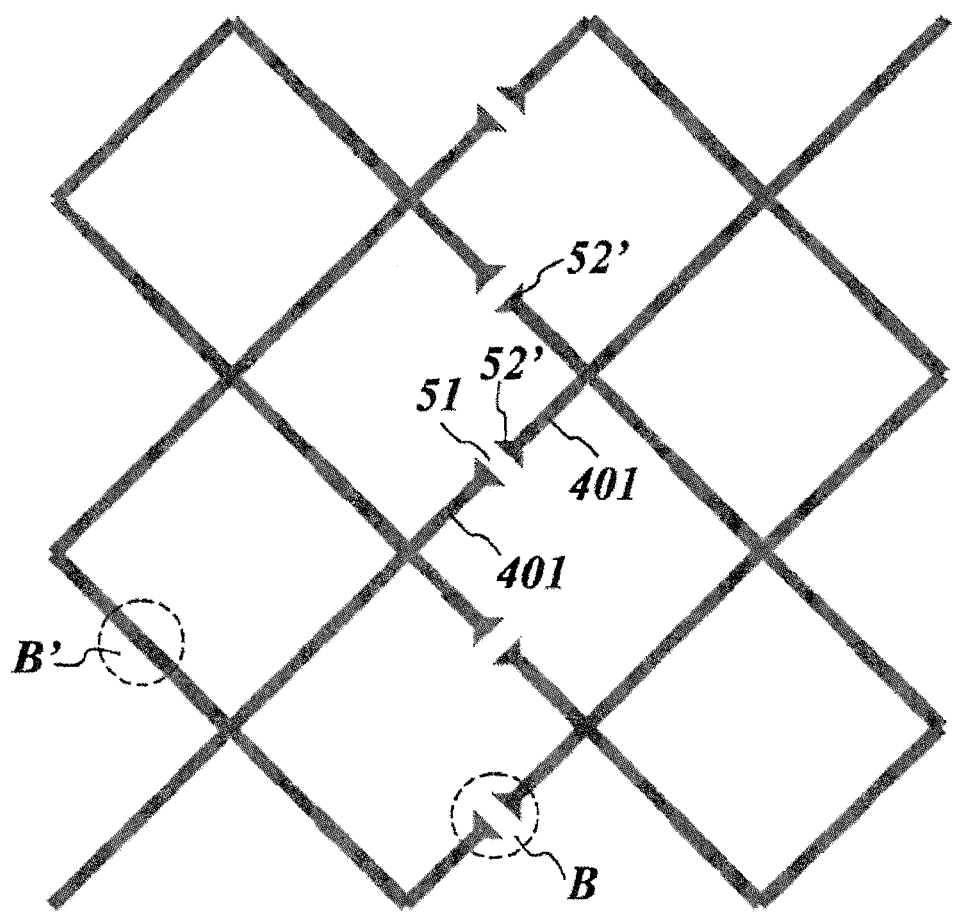
Figure 7:
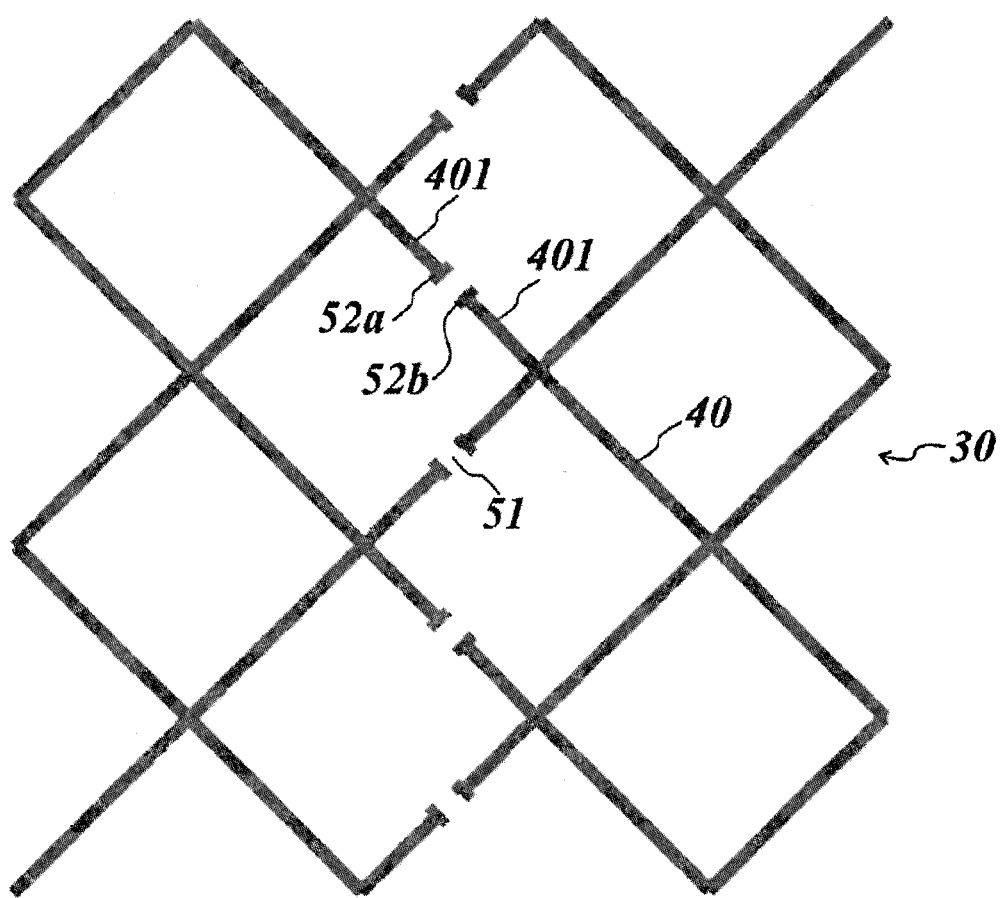
Figure 8:
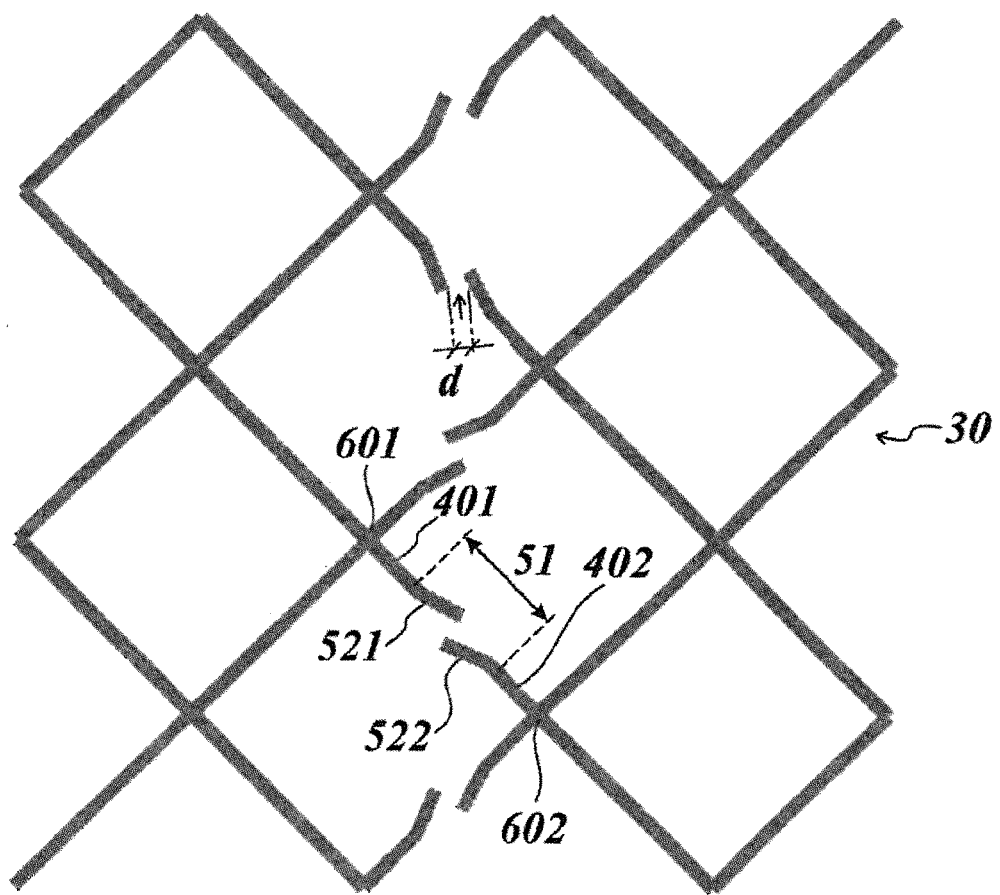
Figure 9:
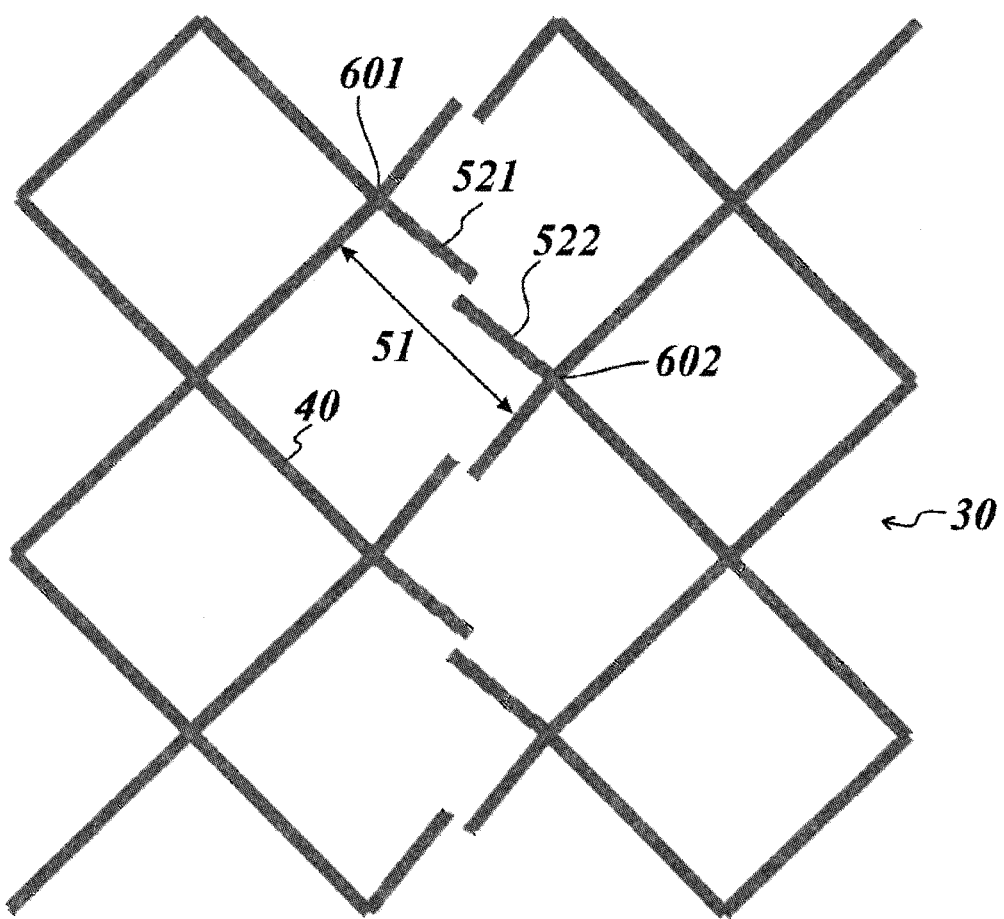
Figure 10A:
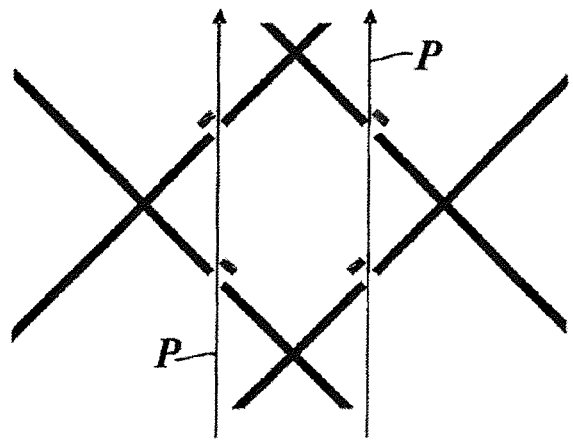
Figure 10B:
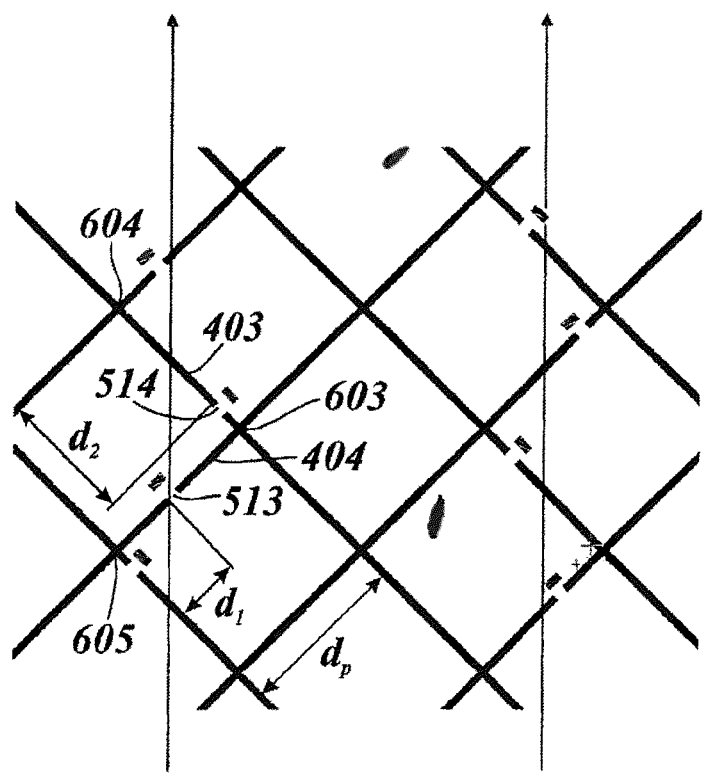
Figure 11A:
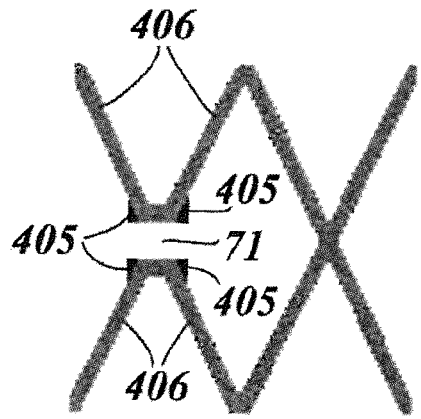
Figure 11B:
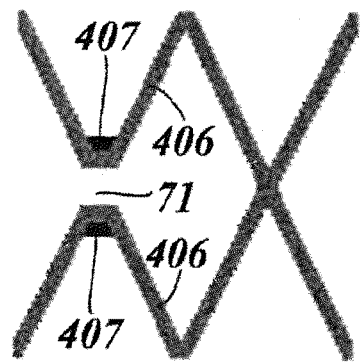
Figure 11C:
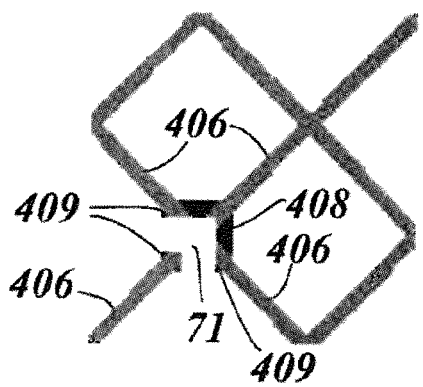
Figure 11D:
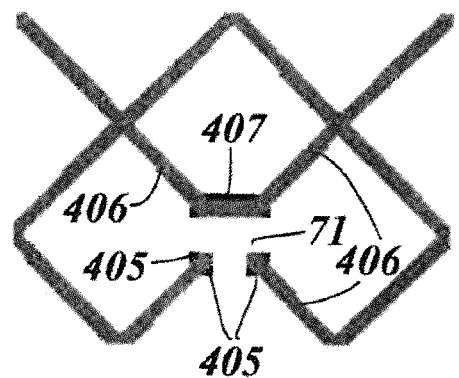
Figure 11E:
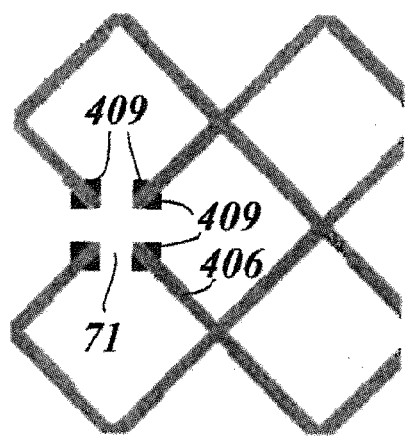
Figure 12A:
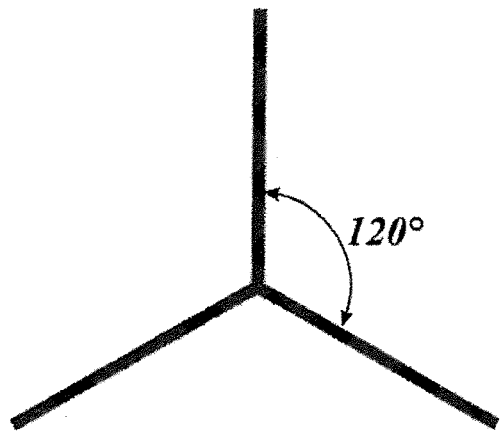
Figure 12B:
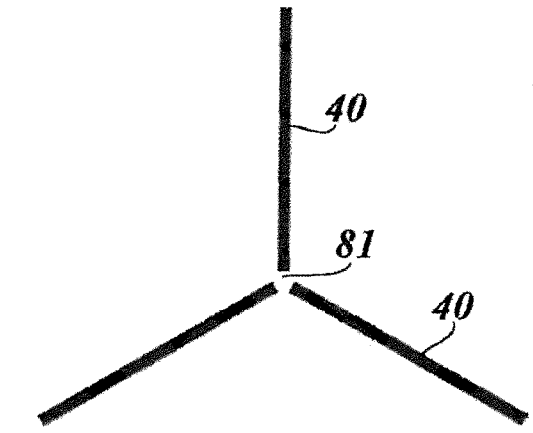
Figure 12C:
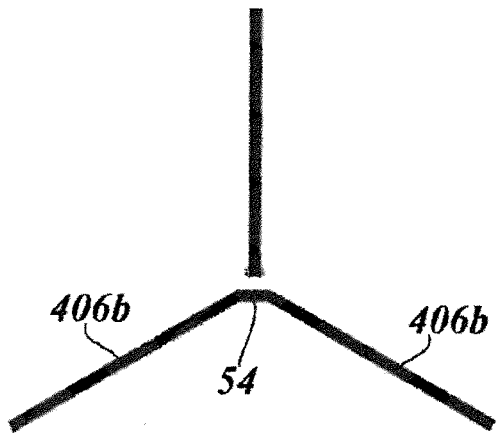
Figure 12D:
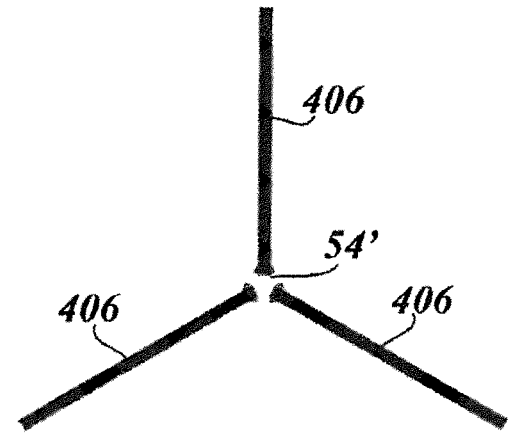
Figure 13A:
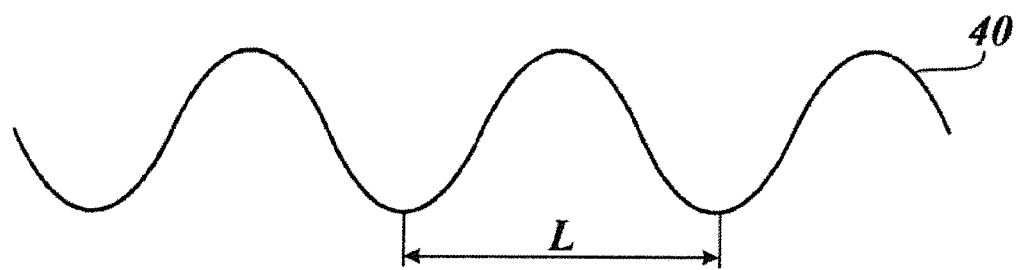
Figure 13B:
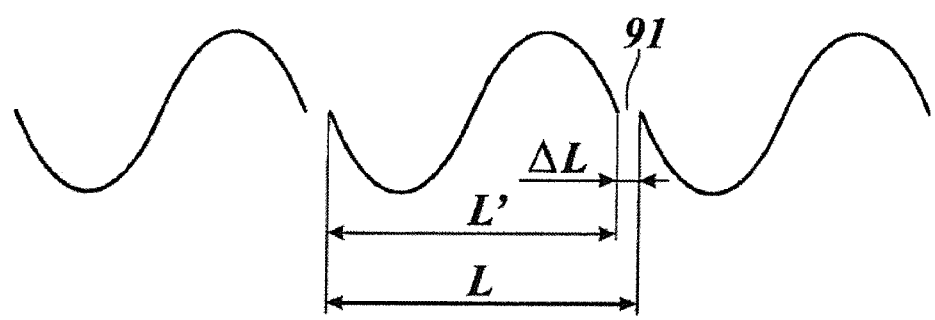
Figure 14A:
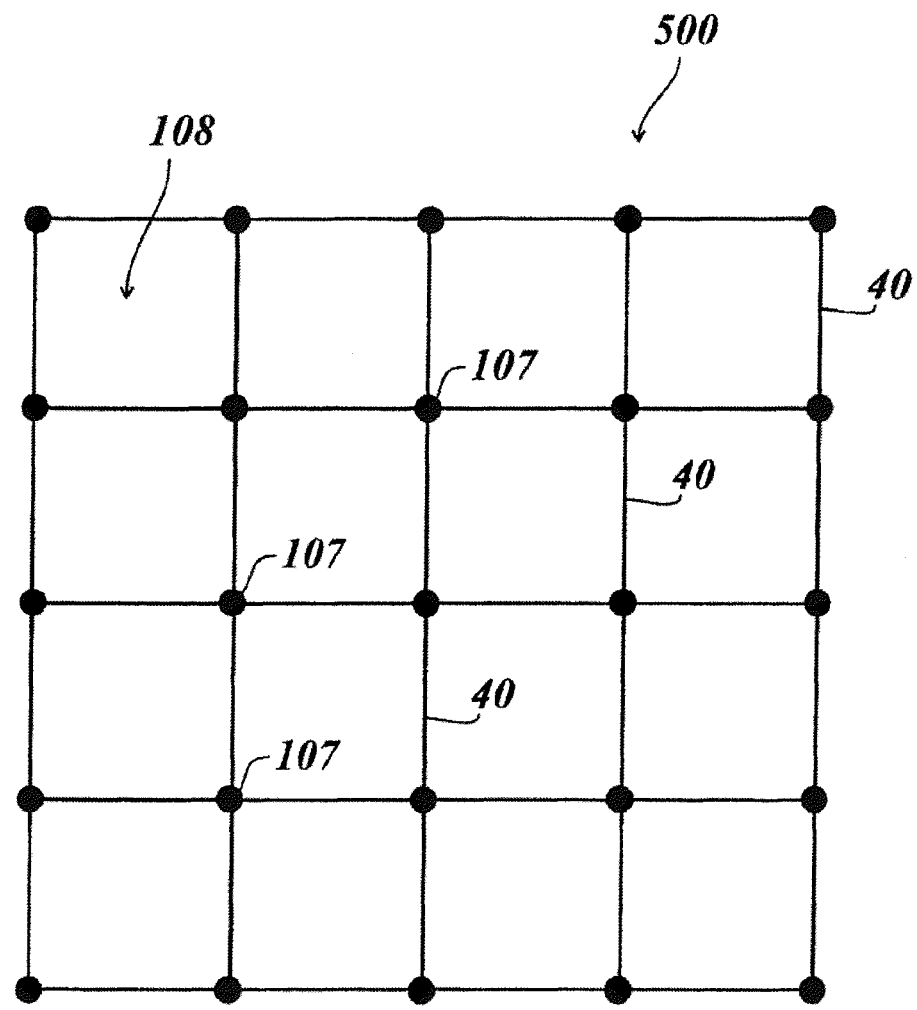
Figure 14B:
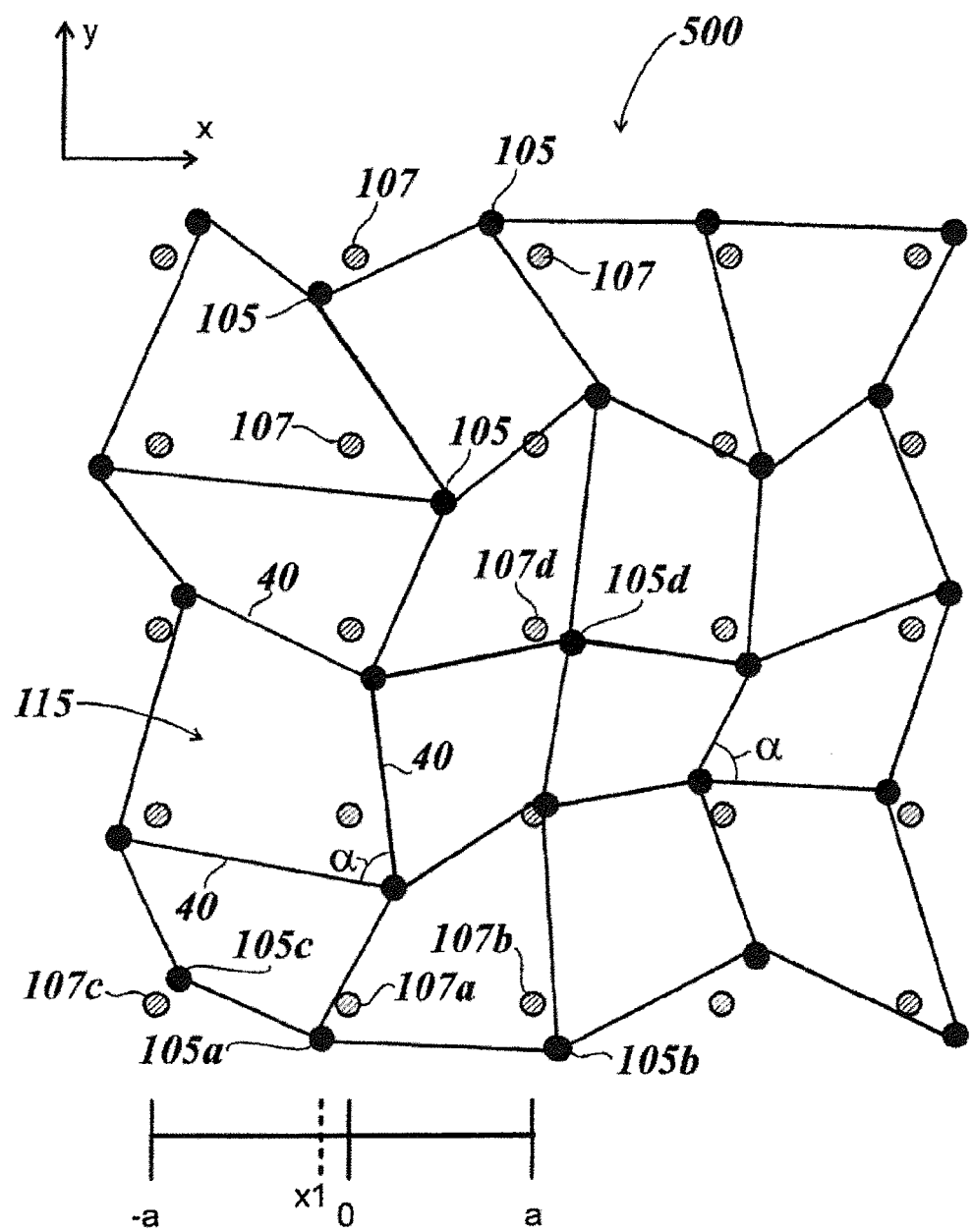
Figure 15A:
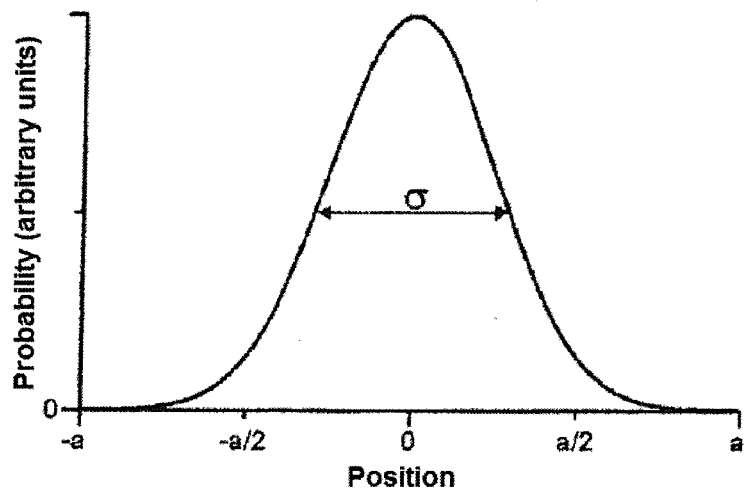
Figure 15B:
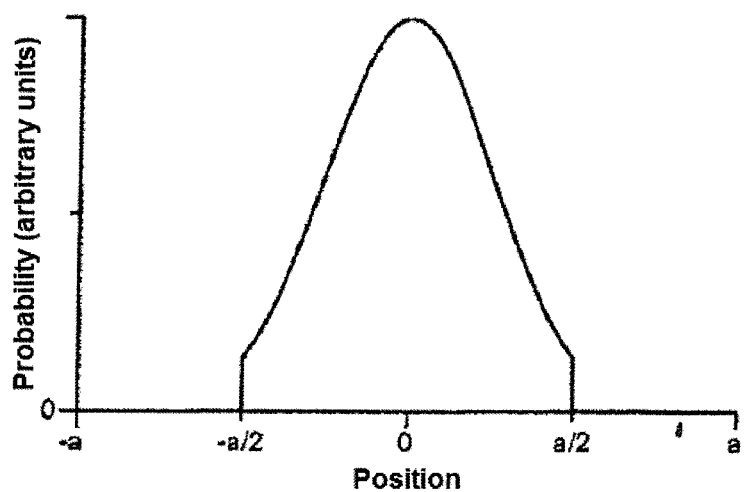
Figure 15C:
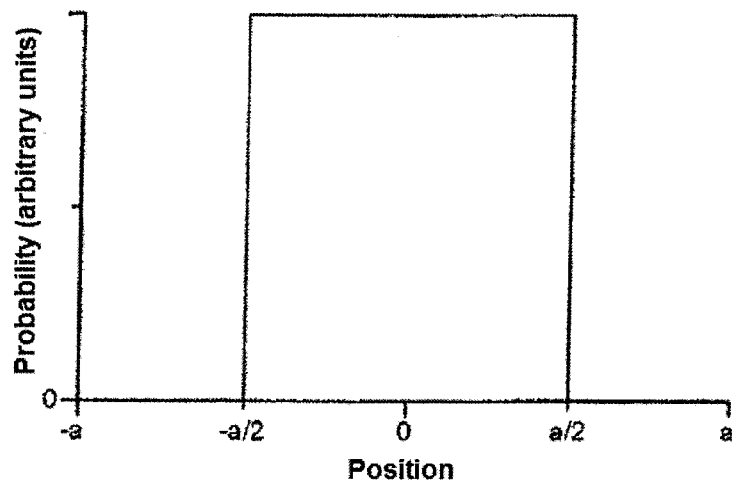
Figure 15D:
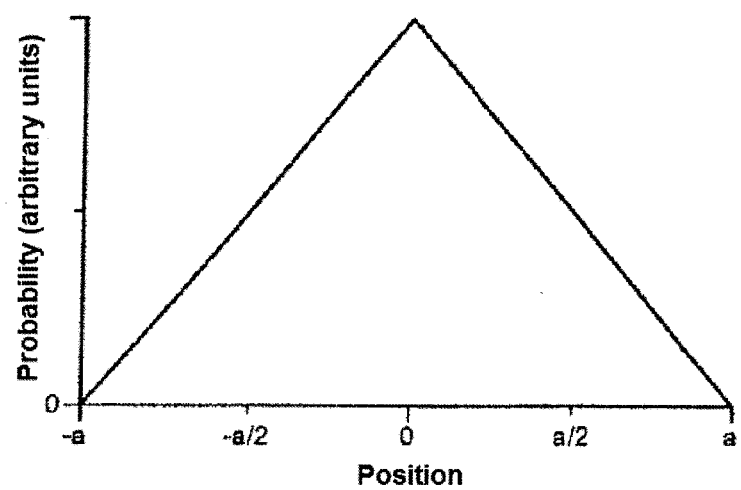
Figure 16:
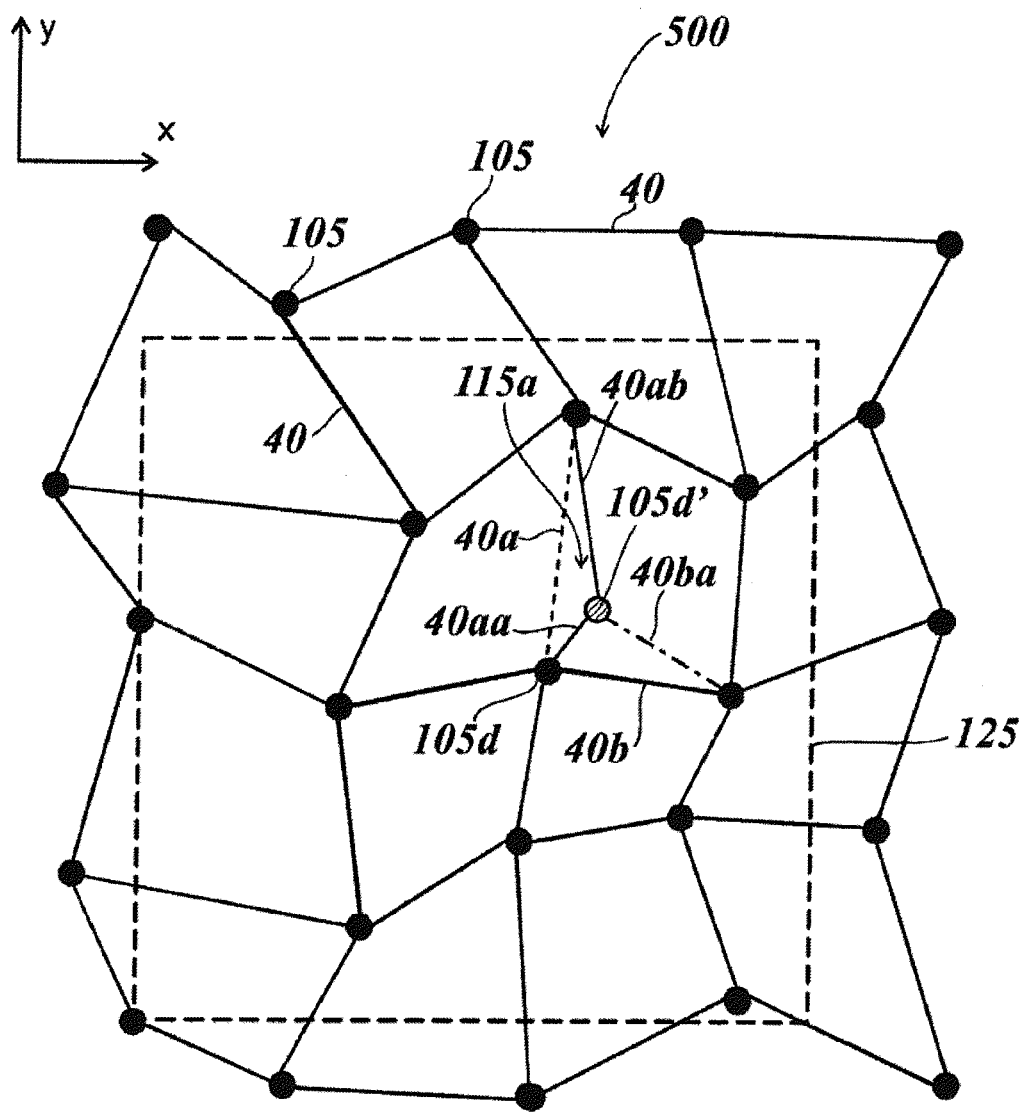
Figure 17A:
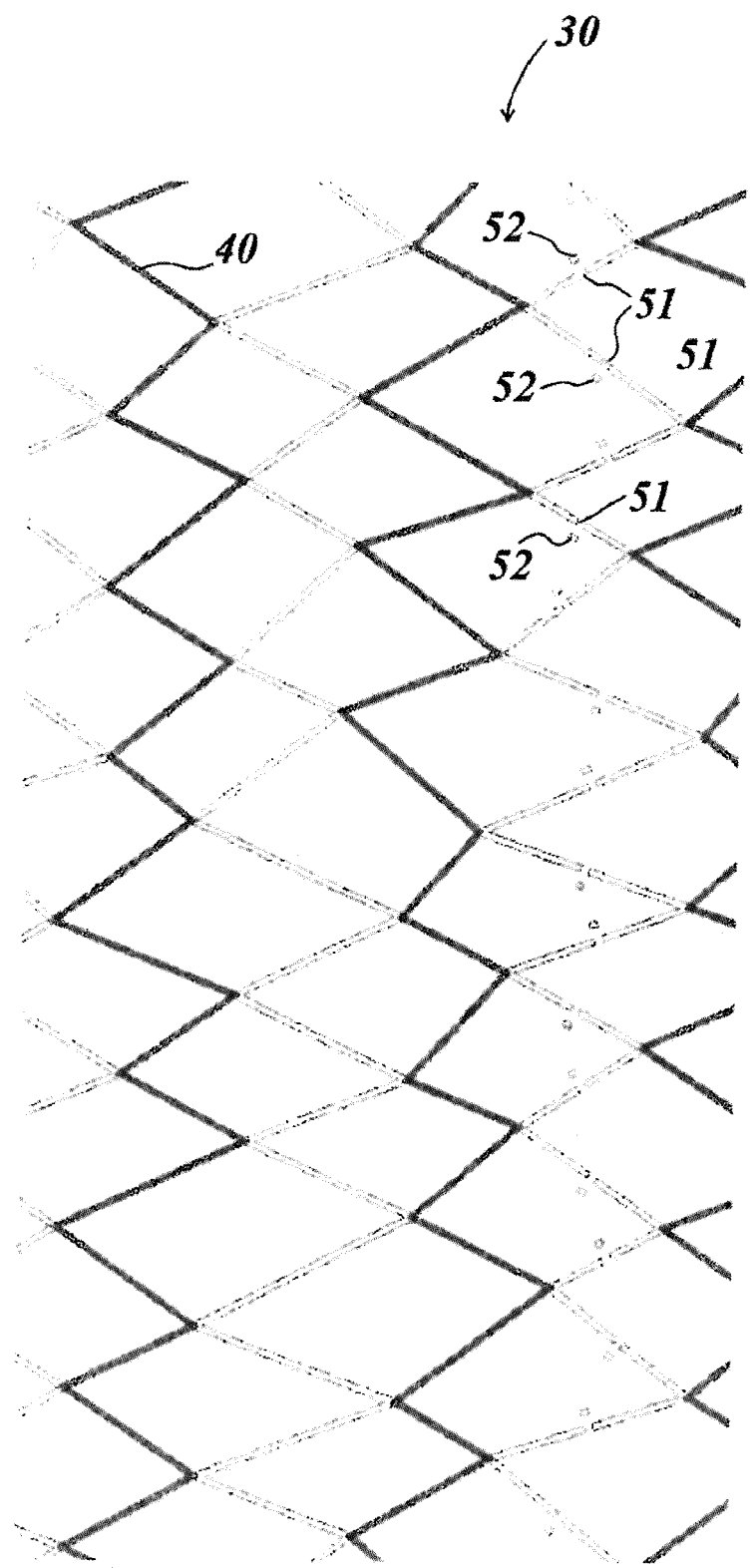
Figure 17B:
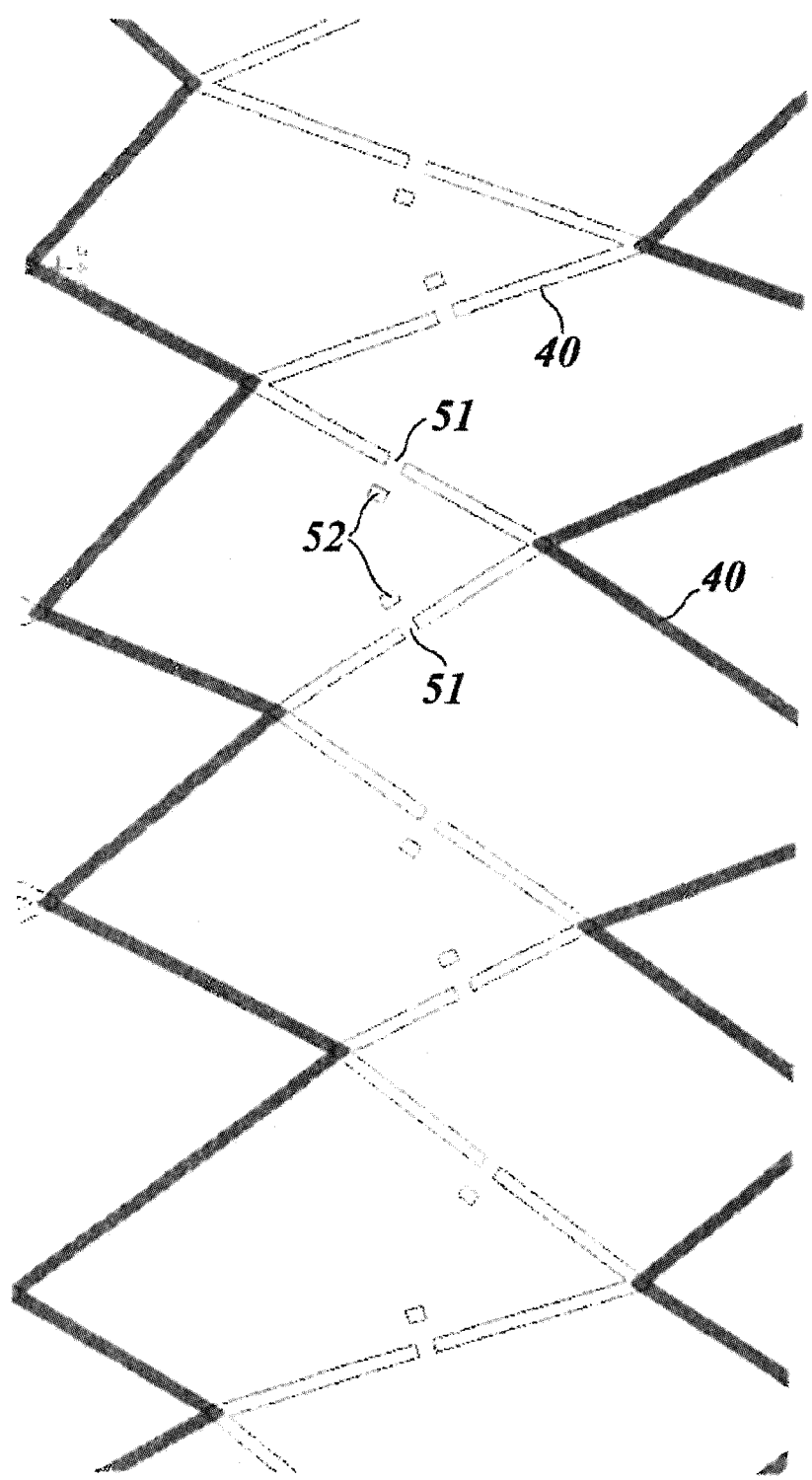
Figure 18A:
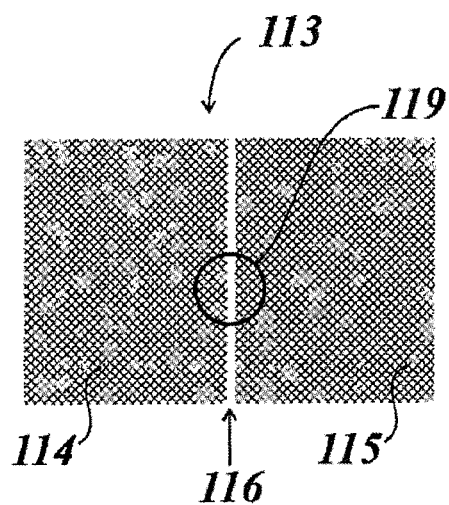
Figure 18B:
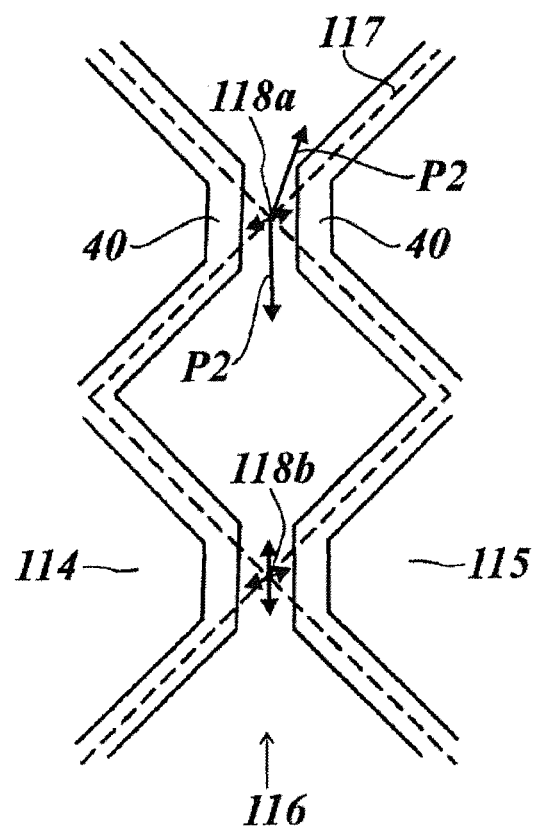
Figure 19:
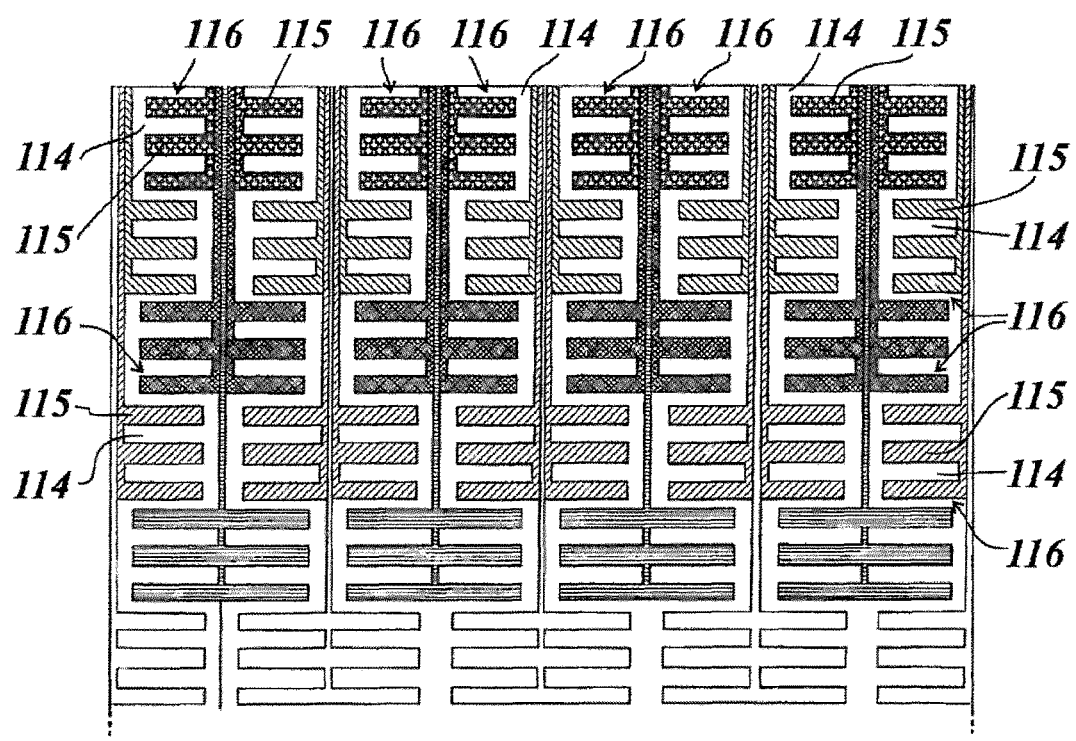

Preferred embodiments of the invention are described in more detail below with reference to the drawing, in which FIG. 1*a* shows a schematic top view of a multi-layer body, FIG. 1*b* shows a schematic sectional representation of a multi-layer body, FIGS. 2*a*-2*d* show schematic representations of a section from a pattern of electrically conductive non-transparent traces, FIG. 3*a* is an enlarged representation of conductor traces in a pattern in the manner of FIG. 2*a* and FIG. 3*b* illustrates such a section with a plurality of omitted sections in the conductor traces which as a whole are visually recognizable and therefore disruptive, FIG. 4 illustrates a section from a pattern of conductor traces in which a first embodiment of the invention is implemented, FIG. 5 illustrates a section from a pattern of conductor traces in which a second embodiment of the invention is implemented, FIG. 6 illustrates a section from a pattern of conductor traces in which a third embodiment of the invention is implemented, FIG. 7 illustrates a section from a pattern of conductor traces in which a fourth embodiment of the invention is implemented, FIG. 8 illustrates a section from a pattern of conductor traces in which a fifth embodiment of the invention is implemented, FIG. 9 illustrates a section from a pattern of conductor traces in which a sixth embodiment of the invention is implemented, FIGS. 10a and 10b explain, with reference to the position of the omitted sections, a preferred variant of the invention that can be used in several embodiments, FIGS. 11a-11e illustrate different embodiments of the invention in which a section is omitted in a junction of conductor traces and a replacement piece is provided, FIG. 12a shows three conductor traces meeting each other at an angle of 120° and FIGS. 12b-12d to this end illustrate embodiments of the invention in which a section is omitted in the junction of the conductor traces, FIG. 13a illustrates a wavy conductor trace, FIG. 13b illustrates an embodiment of the invention in which individual sections of the wave shape are compressed, FIG. 14a illustrates a grid and/or pattern arrangement of conductor traces for activating touch panels, such as forms the starting point for the definition of the grid and/or pattern arrangement according to FIG. 14b, FIG. 14b illustrates a grid and/or pattern arrangement of conductor traces for activating touch panels, such as is proposed according to a further aspect in an embodiment starting from the grid and/or pattern arrangement from FIG. 14a;

FIGS. 15a to 15d show the graphs of distribution curves,

FIG. 16 illustrates a further example of a grid and/or pattern arrangement according to the further aspect, FIG. 17a illustrates an arrangement of conductor traces in a grid pattern in which both an embodiment of the invention is implemented and the further aspect, which was explained with reference to FIGS. 14a to 16, is realized, FIG. 17b shows an enlarged section from the arrangement according to FIG. 17a, and FIGS. 18a and 18b illustrate a further example of a grid and/or pattern arrangement according to the further aspect, FIG. 19 illustrates a touch panel device with differently shaped touch panels.

FIG. 1a shows a top view and FIG. 1b a sectional representation of a multi-layer body 1. The multi-layer body 1 has a carrier substrate 300 which can also be regarded as carrier layer 300. On the carrier substrate 300 there is a first electrically conductive layer 31, a dielectric layer 32 on that, a second electrically conductive layer 33 as well as a dielectric layer 34.

It is also possible that the multi-layer body 1 does not have all of the above-named layers, but only consists of the carrier layer 300 and the first electrically conductive layer 31 (conduction layer). It is further possible that the multi-layer body 1, in addition to the layers shown in FIG. 1b, comprises still further layers, for example one or more decoration layers or further electrically conductive layers.

The multi-layer body 1 has an area 11 in which the multi-layer body 1 appears transparent for the human observer; and it has an area 12 in which the multi-layer body 1 either likewise appears transparent for the human observer or can also be formed semi-transparent or opaque. Furthermore, the multi-layer body 1 has a contact connector 21 with several contact panels 21', via which an electrical contacting of the multi-layer body is possible. However, it is also possible that the multi-layer body 1 does not have such a contact connector, and that the contacting of the electrically conductive layer or layers of the multi-layer body takes place by means of electrically conductive adhesive joints, bonded joints, soldered or welded joints.

The area 11 can be divided roughly into an edge area R and a central area Z.

The carrier substrate 300 preferably consists of a flexible plastic film, for example of polyethylene (PE), polypropylene (PP), polyvinyl chloride (PVC), polystyrene (PS), polyester (PE) and/or polycarbonate (PC) or of any mixture thereof. The flexible plastic film preferably has layer thicknesses of between 15 μm and 300 μm, preferably of between 23 μm and 100 μm. The carrier substrate 300 is formed transparent at least in the area 11; but the carrier substrate is preferably formed over the whole surface and thus consists for example of a transparent plastic film.

The first electrically conductive layer 31 preferably consists of a metal, for example copper, aluminum, chromium, silver or gold, and/or a mixture or alloy of at least two of the above-named materials. This metal layer is preferably applied to the carrier substrate 30 in a layer thickness of between 2 nm and 5 μm, particularly preferably of between 20 nm and 100 nm, and structured. A printing process can be used for the structuring. The application and structuring can also take place in one step, e.g. if an application mask is used. Instead of a metal or in addition, a conductive paste and/or an organic compound with mobile charge carriers such as polyaniline or polythiophene for instance can also be provided.

An adhesion-promoter layer which improves the adhesion of the first electrically conductive layer 31 to the carrier substrate 300 can also be arranged between the carrier substrate 300 and the first electrically conductive layer 31. Such an adhesion-promoter layer is preferably likewise formed from a transparent material.

In the first electrically conductive layer 31, in the area 11 there are provided a plurality of electrically conductive areas 41 of a first class, a plurality of electrically conductive areas 42 of a second class, and connection areas 43. The electrically conductive areas 41 of the first class and the electrically conductive areas 42 of the second class are galvanically isolated from each other, in order that the electrically conductive areas 41 of the first class can act as transmission areas which transmit an electromagnetic field, and the electrically conductive areas 42 of the second class can act as receiving areas which receive an electromagnetic field from an area of the first class. The electrically conductive areas 41, 42 and 43 in each case consist of a pattern of electrically conductive, non-transparent conductor traces 40, or alternatively heat-conducting traces, the width of which in the first area 11 is chosen such that the electrically conductive areas of the first and second class and the connection areas appear transparent for the human eye. The traces 40 thus have for example a width of between 1 μm and 300 μm, preferably of between 5 μm and 50 μm. The connection areas 43 in each case connect one or more of the areas 41 of the first class or of the areas 42 of the second class to a contact area arranged outside the area 11. It is also possible and advantageous that the connection areas 43 outside the area 11 are covered over the whole surface with the electrically conductive layer 31, or are covered with a pattern of electrically conductive, non-transparent traces 40, the width of which is chosen such that the areas 43 in this area 12 do not appear transparent for the human eye. It is hereby possible to increase the conductivity of the areas 43 in the area 12, at the expense of the transparency, which is, however, no longer relevant in this area.

Contact areas can be formed here by the contact panels 21' of the contact connector 21, but it is also possible here that a contact area represents an area in which the first conductive layer 31 is contacted, for example over a via, with another electrically conductive layer; the contact area can also be formed by an area of the first electrically conductive layer 31 in which a connection trace (appearing opaque for the human observer) of the electrically conductive layer 31 passes into an area 43 (appearing transparent for the human observer) of the first class.

As indicated in FIG. 1b, the contact panels 21' of the contact connector 21 are also formed in the first conductive layer 31. However, it is also possible that the contact panels 21' are formed, not in the electrically conductive layer 31, but in another electrically conductive layer, for example in the electrically conductive layer 33. In the area of the contact panels 21, the first electrically conductive layer 31 can here have a larger layer thickness or else be boosted with another or the same electrically conductive material.

The dielectric layer 32 is then applied to the first electrically conductive layer 31. The dielectric layer 32 is preferably a transparent varnish which is applied to the electrically conductive layer 31 by means of a printing process in a layer thickness of from 1 µm to 40 µm. It is advantageous here if, in the areas in which vias 35 are to be provided later, no material is already applied when the dielectric layer 32 is applied.

Furthermore, the electrically conductive layer 33 is then applied. The second electrically conductive layer 33 is preferably a layer which is applied by means of printing an electrically conductive printing material, for example carbon black or conductive silver. During printing, the recesses provided in the dielectric layer 32 here can simultaneously be filled with the printing material and thus the vias 35 through the dielectric layer 32 can simultaneously be filled with conductive material. The conductive layer 33 is preferably structured such that, by means of this layer, several of the connection areas 43 of the electrically conductive layer 31 are electrically connected to each other and thus the number of contact panels 21 of the contact connector 20 can be reduced.

In the area 11 next to the electrically conductive layer 31, further electrically conductive layers are preferably not provided in the multi-layer body 1.

The electrically conductive traces 40 in the three types of areas 41, 42, 43 are preferably arranged according to a pattern illustrated in FIGS. 2a to 2d. FIGS. 2a and 2b illustrate a regular pattern with crossover points. As shown in FIGS. 2c and 2d, the electrically conductive traces 40 are here arranged not parallel to each other as far as possible in order to prevent diffraction and moiré effects, and have a plurality of crossover points in order thus to provide as uniform as possible a surface conductivity in the areas 41, 42 and 43. The patterns according to FIGS. 2c and 2d originate from a regular pattern by stochastic variation of a grid parameter (grid spacing, angle between conductor traces 40). Such patterns are described in more detail further below with reference to FIGS. 14a to 18b.

The electrically conductive traces 40 in each case delimit an area of surface. The delimitation takes place in that a respectively outer conductive trace 40 is spaced apart from the conductive trace 40 of another area of surface and is galvanically isolated from it. The individual areas of surface have a surface area of between 0.25 and 10 cm². The width and spacing of the conductive opaque traces in the individual areas of surface is chosen such that these areas have an average surface conductivity of between 5 ohm (ohm/square) and 100 ohm (ohm/square), preferably between 10 ohm (ohm/square) and 40 ohm (ohm/square).

In FIG. 1b the individual areas of surface 41 and 42 are shown, as first and second areas, spaced apart from each other to such an extent that a galvanic isolation can take place simply by leaving out conductor traces.

A transition is now made to planning patterns to be initially continuous, in the manner of the patterns shown in FIGS. 2a to 2d, and then, in the planning, to omitting individual sections through which a galvanic isolation of a first area (for instance area of surface 41) from a second area (for instance area of surface 42) is provided. The present invention now deals with the question of how such openings can be provided as inconspicuously as possible and to influence the viewing impression of the multi-layer body 1 as little as possible.

FIG. 3a shows, again in enlarged representation, the conductor traces 40 according to the pattern according to FIG. 2a. However, what is described here also applies correspondingly to other patterns, for instance those shown in FIGS. 2b to 2d, wherein these patterns either can be regular or can be generated by, in particular stochastic, variations of a pattern parameter such as for instance distance between conductor traces 40 and angle at which they meet each other in a junction.

The pattern according to FIG. 3a has the advantage of a substantially uniform surface coverage if this surface coverage is determined over areas which comprise several cells of the grid shown. FIG. 3a now shows a transition area between a first area 10 and a second area 20, which are to be galvanically isolated from each other. The transition area here is labeled 30.

In the transition area 30 the pattern is (inherently) continued from the first area 10 and the second 20. In the present case, an omission 51 is provided in each case only in conductor traces 40. The openings 51 align, with the result that an interruption in the surface coverage in the manner of a transparent striped area is to be recognized for the observer already from a distance. On the other hand, the invention intends to prevent such omitted sections 51 from being recognizable for the observer.

FIG. 4 shows a first embodiment of the invention, in which in a transition area 30, generating an opening 51, the omitted sections are replaced by replacement pieces 52 which have exactly the same size as the omitted sections. This can be implemented e.g. very easily in a control program for producing the conductor traces 40 by first defining (in a first so-called "layer") the openings, wherein sections are cut out, and wherein precisely these sections 52 are then shifted only a little (and are provided in a second "layer"). Because the omitted sections are merely shifted, the replacement pieces are nothing more than the omitted sections themselves and, naturally, are the same size as them. In the invention, however, both in the first embodiment according to FIG. 4 and in all further embodiments, it is possible per se that the replacement pieces are larger or smaller than the omitted sections. However, they preferably do not vary by +/−50%, particularly preferably not by more than +/−20% in terms of their superficial area in respect of the omitted sections.

In the second embodiment of the invention according to FIG. 5 the replacement pieces 52 are likewise identical to the omitted sections in the area of the openings 51, but they are rotated by 90°. A rotation by another angle would likewise be possible in principle. The rotation by 90° has the advantage that the replacement pieces have the shape of small conductor trace parts which run parallel to the conductor traces 40 in the third area 30.

In a third embodiment of the invention according to FIG. 6 the omitted sections are split into four parts which are arranged in the shape of small triangles 52' on both sides of the conductor trace parts 401, with the result that the shape of a cuff results. The replacement pieces 52' are thus positioned on the conductor traces 40 or conductor trace parts 401. Through the cuff shape a thickening of the conductor trace parts 401 results at their end facing the omitted section 51, wherein it is brought about by this thickening that over an area of surface B (dashed circle drawn in FIG. 6) an identical surface coverage is achieved to the one in an area B', where no opening 51 is provided. The typical (diameter) dimension of the area B is between 20 and 80 µm.

In a fourth embodiment of the invention the omitted sections are split into two parts and, forming a T shape, positioned at the conductor trace parts 401. The two halves 52a and 52b have the same surface area as the omitted section 51. In principle, however, they can also vary, as already stated above, by between +/−50% in respect of their surface area compared with the omitted section 51 (or half of same).

A fifth embodiment of the invention, which is explained with reference to FIG. 8, makes use of a somewhat different principle: here conductor trace parts 521, 522 are first cut out, with the result that the omitted section 51 is relatively large. Then the cut-out conductor trace parts 521, 522 are inserted again as replacement pieces, but are inserted tilted compared with their original position, namely in each case by the same angle with respect to the conductor trace parts 401 and 402, which remained between the junctions 601 and 602. The galvanic isolation results because of the tilt by the distance d between the conductor trace parts 521 and 522.

A sixth embodiment of the invention is nothing more than a variant of the embodiment according to FIG. 8: here conductor trace parts 401 and 402 no longer remain, but conductor trace parts 521, 522 are directly separated at the junctions 601, 602. The opening 51 thus has the length of a grid constant. In the opening 51 the two omitted partial sections, thus the conductor trace parts 521 and 522, are now inserted likewise tilted again.

When the tilt angle is chosen, attention can be paid that undesired diffraction effects are prevented. In particular in the case of an irregular grid, the conductor trace parts 521, 522 in the tilted state can run parallel to other conductor traces 40. (This is not illustrated in the figure.)

In all of the above-named embodiments the openings 51 are in each case arranged between two junctions or crossover points. However, until now, it was common to these that the openings 51 lay on a straight line. This is illustrated again in FIG. 10a with reference to the embodiment according to FIG. 4, see the arrows P.

Now, illustrated in FIG. 10b for the first embodiment according to FIG. 4, it can, however, be provided that at least two openings 513, 514 are spaced apart in neighboring conductor traces 403, 404 between in each case a pair of crossover points 603; 604 on the one hand or 603; 605 on the other hand in each case differently from the crossover points 604 and 605 neighboring each other. The opening 513 lies removed from the junction 605 at the distance $d_1$ on a little less than half of a grid period $d_P$. In contrast the opening 514 lies removed from the junction 604 at a distance $d_2$ which extends over more than half of a grid period $d_P$.

This principle explained with reference to FIG. 10b can be applied to all of the named embodiments according to FIG. 4 to FIG. 9.

In addition to these embodiments with openings between in each case two junctions, openings can also be provided at the crossover or junction, thus the junction can easily be dispensed with. Corresponding embodiments are represented in FIGS. 11a to 11e:

In an embodiment according to FIG. 11a openings 71 are provided in a junction or crossover point, but the presence of these openings is compensated for by the positioning of small triangles 405 at the conductor trace parts 406 which lead to the crossover point that was dispensed with.

In the embodiment according to FIG. 11b the same triangles are inserted as replacement pieces 407 into the channels between the conductor trace 406.

The embodiments according to FIGS. 11a and 11b are represented in the present case for rhombic grid cells, but can also be used in principle for square grid cells.

In the case of square grid cells, furthermore, there is also the embodiment according to FIGS. 11c, 11d and 11e: in the embodiment according to 11c a piece is cut out of all four conductor trace parts 406, in order to form the opening 71. Two larger replacement pieces 408 are inserted on one side such that they maintain the opening 71. Furthermore, still smaller replacement pieces 409 are also provided.

The embodiment according to FIG. 11d is, effectively, a combination of the embodiments according to FIGS. 11a and 11b with a larger replacement piece 407 in a channel between two conductor traces 406 and otherwise smaller replacement pieces 405 in a triangular shape.

In the embodiment according to FIG. 11e there is a rotational symmetry, for each conductor trace 406 two small triangular replacement pieces 409 are provided.

Further modifications which are oriented for example towards the embodiments according to FIG. 4 to FIG. 9 are likewise possible.

With reference to FIGS. 12a to 12d it is now explained what corresponding solutions can look like in the case of a pattern with a hexagonal grid cell: here the individual conductor traces butt against each other at an angle of 120°, see FIG. 12a. If an opening 81 is provided now, see FIG. 12b, this opening 81 can be visible when the multi-layer body with such patterns for the conductor traces 40 is viewed.

In an embodiment according to FIG. 12c an area of section 54 cut out of the opening 81 is inserted again now, namely such that the two lower conductor traces 406b and 406b are galvanically connected to each other.

In the embodiment according to FIG. 12d the section cut out is split into six parts, and it is positioned at the conductor trace parts 406, see sections 54' in FIG. 12d.

With reference to FIGS. 2b and 2d it can be seen that the conductor traces can also be formed wavy. An individual such conductor trace 40 is represented in FIG. 13a. If it is now desired to provide an omitted area 91, in the present case something is not simply cut out of the conductor trace 40; rather the conductor trace is cut out over a larger section, for example over a period with the length L, and the section cut out is compressed to the length L'. The space ΔL thereby made available ensures the galvanic isolation.

FIG. 14a again illustrates the arrangement of conductor traces 40 according to FIG. 2a, but grid points 107 are additionally drawn in to explain how other arrangements, for instance the arrangement according to FIG. 2c, can be defined.

The grid points 107 form the crossover points of the conductor traces 40, wherein the conductor traces 40 connecting these grid points 107 typically define square, rectangular or e.g. rhombic unit cells 108. If this touch-sensitive layer 31 formed with regularly arranged conductor traces 40 is overlaid on a liquid-crystal display with an arrangement of image points in a periodic grid, then moiré effects which are perceived as disruptive and impair the legibility of the liquid-crystal display through the touch-sensitive layer 31 result for an observer.

It can be provided that the touch-sensitive layer 31 is constructed in two layers with electrically conductive planes of conductor trace grids spaced apart and galvanically isolated from each other. Then disruptive moiré effects can already occur within the touch-sensitive layer by the superimposition of the conductor trace grids. This can be the case for example with two-layered, resistive or capacitive touch displays.

FIG. 14b shows an example of a grid 500, in which at least some of the grid points 105 and/or at least some of the edges of the unit cells 115 of the grid 500, thus the grid cells 115, are placed statistically, thus randomly within predetermined limits, and/or varied in terms of length and/or angle relative to each other. Due to the offset position of the grid points, the grid points 107a to 107d placed statistically within predetermined limits are from the regularly, i.e. periodically, arranged grid points 107. The length of the edges from conductor traces 40 varies exactly like the angle α which the conductor traces 40 enclose with each other at grid points 107.

For example it is provided in the grid 500 of FIG. 14b that the grid point 107a is located at the x position "0". The neighboring grid points 107b and 107c are then located at the x positions "a" and "−a", wherein a is the grid constant of the periodic grid 5 from FIG. 3. According to the embodiment of the invention shown here it is provided to place the grid point 105a at the x position x1, which deviates from the x position 0. A shift of the grid point 105a along the y-axis (not shown in addition here) takes place analogously. Thus a grid is formed in which the grid points 107 are placed shifted with a particular frequency along the x- and y-axes by particular values within the limits −a and a.

The frequency with which the shift adopts particular values can be defined, for example as shown in FIG. 15a, with normal Gaussian distribution. The probability of finding the grid point 105a at a respective specific x position is plotted in FIG. 15a. If for example a bar chart is generated for all x positions of the grid points 105 of the touch-sensitive layer 31, this bar chart would approximate the course of the graph of FIG. 15a. The width σ of the distribution can be chosen. The width σ is advantageously chosen such that the probability of the shift of a grid point 107 beyond the position of the neighboring grid point is virtually zero.

To this end, the normal distribution of FIG. 15a can in particular be combined with an additional cutting specification. It is thus provided according to FIG. 15b to set the probability of discovering the grid point 105a originally placed at the position "0" at a position outside of the interval [−a/2; a/2] to zero. The result is that, for example, the grid point 105a is located no closer to the grid point 107b than the grid point 105b belonging to this grid point. Thus, four-sided, although not rectangular, grid cells 115 are furthermore predetermined.

Instead of normal distribution, as shown in FIGS. 15a and 15b, any other distributions can also be provided, for example the uniform distribution according to FIG. 15c or the triangular distribution according to FIG. 15d.

The distributions are represented for a spatial dimension (x or y direction). However, the associated two-dimensional expansions are in particular also provided. The distributions can also be combined with each other as desired and/or differ from each other in the two spatial dimensions.

As shown in FIG. 16, for homogenization of the surface coverage the choice and/or adaptation of the distribution can be carried out such that the density of the surface coverage with conductor traces 40 corresponds to a predetermined average value within a predetermined area of surface 125 which corresponds for example to a touch panel or a receiving or transmission panel or this value shifts only within a particular width. It is particularly preferred if this surface coverage fluctuates only by a predetermined percentage value for each identically sized area of surface 125 that can be positioned as desired on the grid 105. In the case of an area of surface 125 chosen to be sufficiently large, a virtually constant surface coverage with conductor traces 40 is then obtained, with the result that a virtually homogeneous surface conductivity is guaranteed despite the non-periodic grid.

For example it can be provided that the area of surface 125 has a surface area of 5a*5a=25 a². Furthermore, it can be predetermined that, independently of the respective position of this area of surface 125 on the surface covered with grids 105, the proportion of the surface covered with conductor traces 40 in the total surface (=25 a²) of the area of surface 125 never deviates by more than 5% from the average value (this proportion for all possible positions of the area of surface 125).

As shown in FIG. 16, it is also within the meaning of the further aspect to introduce, for example, additional grid points 105. In the example according to FIG. 16 a conductor trace density that is too small results within the area of surface 125 without additional grid points 105. The conductor trace density is increased in that the grid point 105d' is inserted for example in addition to the grid point 105d. Alternatively or as a supplement, the conductor trace 40a can be replaced by the conductor traces 40aa and 40ab. In turn, instead of the conductor trace 40b, the conductor traces 40aa and 40ba can be formed alternatively or as a supplement, whereby the conductor trace density is in turn increased. Alternatively it can also be provided for example to form the conductor traces 40aa and 40ab in addition to the conductor trace 40a, with the result that an additional triangular cell 11a results.

Thus it is shown in FIG. 16 how the surface coverage density can be set. The construction principle can also be understood as a doubling of the original grid point 107d from FIG. 4 into the two grid points 105d and 105d'. These two grid points 105d and 105d' can correspond to the respectively predetermined distributions, but they can also correspond independently of each other to one distribution. It is unfavorable and undesired if the two grid points 105d and 105d' lie on the same point.

Any further grid points 105 and/or pieces of conductor traces 106 can be inserted.

The conductor traces 106 are formed rectilinear for example, as shown in FIG. 16. However, they can also be formed curved and in particular sinusoidal, as was represented above with reference to FIGS. 13*a* and 13*b*.

FIG. 17*a* shows an arrangement of electrically conductive conductor traces 40 in a pattern, the formation of which was explained above with reference to FIG. 14*b*. In addition, as was also already explained above with reference to FIG. 4, openings 51 which are replaced by replacement pieces 52 are provided in a transition area 30 shown enlarged in FIG. 17*b*.

FIGS. 18*a* and 18*b* show the embodiment of the invention in which the grid 500 is formed from transparent gaps 116 between touch panels 113 or touch panel parts such as receiving panel 114 and transmission panel 115.

In the case of superimposition, in particular in the case of a two-layered structure, provided in deviation from FIG. 1*b*, of the touch-sensitive layer, a grid 500 of transparent gaps 116 can also form superstructures which bring about a moiré diffraction effect or other disruptive optical effects. According to an embodiment of the invention it is therefore provided to shift the virtual grid point 118 of the transparent gap, illustrated by reference lines 117 in FIG. 18*b*, exactly like the grid points 107 to other grid point positions 105. The shift provided is illustrated here by the arrows P2. Thus it is provided according to the invention for example to break open the rectilinearity of the gap 116.

FIG. 18*b* shows the section 119 from FIG. 18*a*. As shown by means of the reference lines 117, a virtual grid point results within the gap 116, which can be manipulated around its 0 position exactly like the other grid points 107 in FIGS. 14 and 16. In practice there is provided a shift of the conductor traces 40, in the extension of which, as shown by the reference lines 117, the virtual grid points 118*a* and 118*b* form.

FIG. 19 shows a touch panel apparatus in a top view. Electrically conductive areas of surface 114 and 115 which build up a touch panel are to be recognized. The areas of surface 114 and 115 are arranged spaced apart from each other by a galvanic gap 116 which is also transparent because of the transparency of the substrate. The areas of surface 114 and 115 represent the "filled" grid meshes of a grid, the grid lines of which the transparent gap 116 forms. If an area of surface 114 or 115 is viewed in detail, grids of non-transparent conductor traces result, as shown in FIG. 18*a* and still more enlarged in FIG. 18*b*. If the lines shown through the coverage with non-transparent conductor traces, as shown in FIG. 18*b*, are continued, virtual transparent grid points 118 result, the position of which is arranged uniformly periodically in the regularly periodic structure but is shifted evenly according to the invention, as shown in FIG. 18*b* by the arrows P2.

The invention claimed is:

1. A multi-layer body comprising:
a carrier layer; and
on the carrier layer, at least one conduction layer with electrically conductive conductor traces;
wherein the multi-layer body has a first area and a second area, wherein both in the first area and in the second area in each case conductor traces are galvanically coupled to each other in that they are provided in an arrangement in which the conductor traces in each case touch one or more other conductor traces, and wherein the two areas are galvanically isolated from each other by a third area, and wherein in the third area the conductor traces are continued;
wherein sections are omitted from the conductor traces such that isolation points are formed, and in that the omitted sections are replaced by conductive, replacement pieces which are arranged at or next to the isolation points coplanar with the traces and which are arranged such that a galvanic isolation, brought about by the omission, of the first and second areas is maintained;
and in that the replacement pieces are arranged sufficiently close to the isolation points such that an average coverage of the carrier layer area with electrically conductive material, which is determined in each case for units of surface area with a dimension of between 20 μm and 80 μm in an x or y direction over the first, third and second areas, does not fluctuate by more than 15% among the different units.

2. The multi-layer body according to claim 1, in which the conductor traces have a uniform width of between 1 μm and 300 μm, and the replacement pieces are spaced apart from the conductor traces by at most three times this width.

3. The multi-layer body according to claim 1 wherein openings are provided at crossover points of the conductor traces and the replacement pieces are positioned at in each case at least one pair of conductor traces.

4. The multi-layer body according to claim 1, which has, as first and second areas, a plurality of transmission areas and receiving areas for providing a touch panel functionality.

5. The multi-layer body according to claim 1 arranged as a touch panel apparatus or as a part of such an apparatus.

6. The multi-layer body according to claim 1 arranged as a heating element.

7. The multi-layer body according to claim 1 wherein openings are provided between crossover points of the conductor traces.

8. The multi-layer body according to claim 7 wherein the replacement pieces are placed next to the conductor trace parts.

9. The multi-layer body according to claim 7 wherein the replacement pieces are positioned at the conductor trace parts forming at least one of a T shape, an arrow shape, or a cuff shape.

10. The multi-layer body according to claim 7 in which at least two openings are spaced apart in neighboring conductor traces which form a crossover point wherein adjacent thereto on further neighboring traces there are two further spaced apart neighboring crossover points associated with corresponding traces and further spaced apart openings, each associated with a different one of the two spaced apart crossover points such that next adjacent openings associated with such crossover points are offset relative to each other in both the x and y directions such that the lengths of the traces from each crossover point to the next adjacent opening differ.

11. The multi-layer body according to claim 7 wherein the replacement pieces are conductor trace parts tilted away from each other at the same angle.

12. The multi-layer body according to claim 11 wherein the conductor trace parts are in each case tilted relative to one another at the crossover points.

13. The multi-layer body according to claim 11 wherein the tilted conductor trace parts are in each case tilted compared with other conductor trace parts protruding from the crossover points and preferably are tilted at the same angle as conductor traces or conductor trace parts protruding from the respective crossover points.

14. The multi-layer body according to claim 1 wherein the arrangement of the conductor traces has a regular pattern.

15. The multi-layer body according to claim 1 wherein the arrangement of the conductor traces originates from a regular pattern by stochastic variation of a parameter defined to form a regular pattern.

16. The multi-layer body according to claim 15, wherein the pattern forms the coverage of the carrier layer as a grid of non-transparent conductor traces and/or of transparent gaps between grid cells filled with coverage by conductor traces and at least some of the grid points forming the grid and/or at least some of the edges of the grid cells are placed randomly or pseudorandomly within predetermined limits and/or are varied in terms of length and/or angle relative to each other.

17. The multi-layer body according to claim 16 wherein the distribution of the grid points within the set limit corresponds to a normal distribution, a uniform distribution or a triangular distribution.

18. The multi-layer body according to claim 16 wherein the average coverage density in the grid with non-transparent traces and/or grid points is homogeneous within a predeterminable area of surface.

19. The multi-layer body according to claim 18, wherein the homogeneity of the coverage density of the predeterminable area of surface is achieved completely or partially by additional grid points.

20. The multi-layer body according to one of claims 14 to 17 wherein the pattern is a grid pattern with at least one of square, rhombic, triangular or hexagonal cells.

21. The multi-layer body according to one of claims 14 to 17 wherein the pattern has a regular non-rectilinear or curved partial pattern in which the sections are omitted, and in that the replacement pieces are provided by compression of the regular non-rectilinear or curved partial patterns.

22. The multi-layer body according to claim 21 wherein the partial pattern is sinusoidal.

* * * * *